(12) United States Patent
Wegner et al.

(10) Patent No.: US 7,637,385 B2
(45) Date of Patent: Dec. 29, 2009

(54) ELECTRICAL BOX EXTENSION

(76) Inventors: Wesley Gene Wegner, 3486 Robin Hill, Thousand Oaks, CA (US) 91360; Paul Brett Wegner, 13416 Beach St., Los Angeles, CA (US) 90292

( * ) Notice: Subject to any disclaimer, the term of this patent is extended or adjusted under 35 U.S.C. 154(b) by 0 days.

(21) Appl. No.: 11/929,476

(22) Filed: Oct. 30, 2007

(65) Prior Publication Data
US 2008/0047729 A1    Feb. 28, 2008

Related U.S. Application Data

(63) Continuation of application No. 10/971,921, filed on Oct. 21, 2004, which is a continuation-in-part of application No. 10/349,746, filed on Jan. 21, 2003, now Pat. No. 6,820,760, which is a continuation-in-part of application No. 10/144,210, filed on May 13, 2002, now abandoned.

(60) Provisional application No. 60/370,419, filed on Apr. 4, 2002.

(51) Int. Cl.
*H02G 3/08* (2006.01)

(52) U.S. Cl. .................. 220/3.7; 220/3.94; 220/3.2; 220/3.3; 174/57

(58) Field of Classification Search .............. 220/3.7, 220/3.94, 3.2, 3.3, 3.9; 174/57, 58
See application file for complete search history.

(56) References Cited

U.S. PATENT DOCUMENTS

| | | | | |
|---|---|---|---|---|
| 740,663 A | * | 10/1903 | Krantz | 220/3.7 |
| 1,197,644 A | * | 9/1916 | Lutz | 220/3.7 |
| 2,886,630 A | * | 5/1959 | Gill | 174/57 |
| 2,989,206 A | * | 6/1961 | McAfee | 220/3.7 |
| 3,006,216 A | | 10/1961 | Sisson et al. | |
| 3,189,077 A | | 6/1965 | Willis et al. | |
| 3,318,476 A | * | 5/1967 | Clark | 220/3.4 |
| 3,319,919 A | | 5/1967 | Eisenberg | |
| 3,424,333 A | * | 1/1969 | Pimentel | 220/3.6 |
| 3,433,886 A | * | 3/1969 | Myers | 174/57 |
| 3,651,245 A | * | 3/1972 | Moll | 174/51 |
| 3,955,701 A | * | 5/1976 | Fisch | 220/3.7 |
| 4,023,697 A | * | 5/1977 | Marrero | 220/3.4 |
| 4,331,832 A | * | 5/1982 | Curtis et al. | 174/57 |
| 4,399,922 A | * | 8/1983 | Horsley | 220/3.6 |

(Continued)

OTHER PUBLICATIONS

Non-Final Office action mailed Aug. 1, 2007, for U.S. Appl. No. 10/971,921.

(Continued)

*Primary Examiner*—Anthony Stashick
*Assistant Examiner*—Christopher B McKinley
(74) *Attorney, Agent, or Firm*—Michael Blain Brooks; Michael B. Brooks

(57) ABSTRACT

Disclosed is an electrical box extension that includes an extending member for switch and/or plug mounting having one or more fastening brackets, one or more base fastening brackets and one or more fasteners that together with optional contact points provide for mechanical and electrical connectivity between the extending member and its associated electrical box and provide sufficient mechanical resistance to support the adjustable elevation of the elevating member thereby supporting a flush surface for surface mounted sockets, switches and their associated plates.

3 Claims, 37 Drawing Sheets

U.S. PATENT DOCUMENTS

| | | | | |
|---|---|---|---|---|
| 4,603,789 | A * | 8/1986 | Medlin, Sr. | 220/3.9 |
| 4,622,435 | A * | 11/1986 | Trainor et al. | 174/57 |
| 4,634,015 | A * | 1/1987 | Taylor | 220/3.7 |
| 4,685,037 | A * | 8/1987 | Akiyama et al. | 362/276 |
| 4,927,039 | A * | 5/1990 | McNab | 220/3.7 |
| 5,012,043 | A * | 4/1991 | Seymour | 174/57 |
| 5,042,673 | A * | 8/1991 | McShane | 220/3.7 |
| 5,117,996 | A * | 6/1992 | McShane | 220/3.7 |
| 5,293,003 | A * | 3/1994 | Prairie, Jr. | 174/57 |
| 5,402,902 | A * | 4/1995 | Bouley | 220/3.2 |
| 5,596,174 | A * | 1/1997 | Sapienza | 174/57 |
| 5,680,947 | A * | 10/1997 | Jorgensen | 220/3.9 |
| 5,736,674 | A | 4/1998 | Gretz | |
| 5,931,325 | A * | 8/1999 | Filipov | 220/3.7 |
| 5,959,246 | A | 9/1999 | Gretz | |
| 5,967,354 | A * | 10/1999 | Whitehead et al. | 220/3.3 |
| 5,975,323 | A * | 11/1999 | Turan | 220/3.7 |
| 6,180,879 | B1 * | 1/2001 | Gretz | 174/50 |
| 6,204,447 | B1 * | 3/2001 | Gretz | 174/50 |
| 6,307,154 | B1 * | 10/2001 | Gretz | 174/50 |
| 6,457,914 | B1 | 10/2002 | Andras et al. | |
| 6,576,837 | B1 * | 6/2003 | Pimentel | 174/58 |
| 6,649,835 | B2 * | 11/2003 | Gilleran | 174/58 |
| 6,820,760 | B2 * | 11/2004 | Wegner et al. | 220/3.94 |
| 6,875,922 | B1 * | 4/2005 | Petak et al. | 174/58 |
| 6,929,140 | B2 * | 8/2005 | Rose | 220/3.7 |
| 7,053,300 | B2 * | 5/2006 | Denier et al. | 174/58 |
| 2005/0051354 | A1 * | 3/2005 | Wegner et al. | 174/58 |

OTHER PUBLICATIONS

Non-Final Office action mailed Feb. 21, 2007, for U.S. Appl. No. 10/971,921.

* cited by examiner

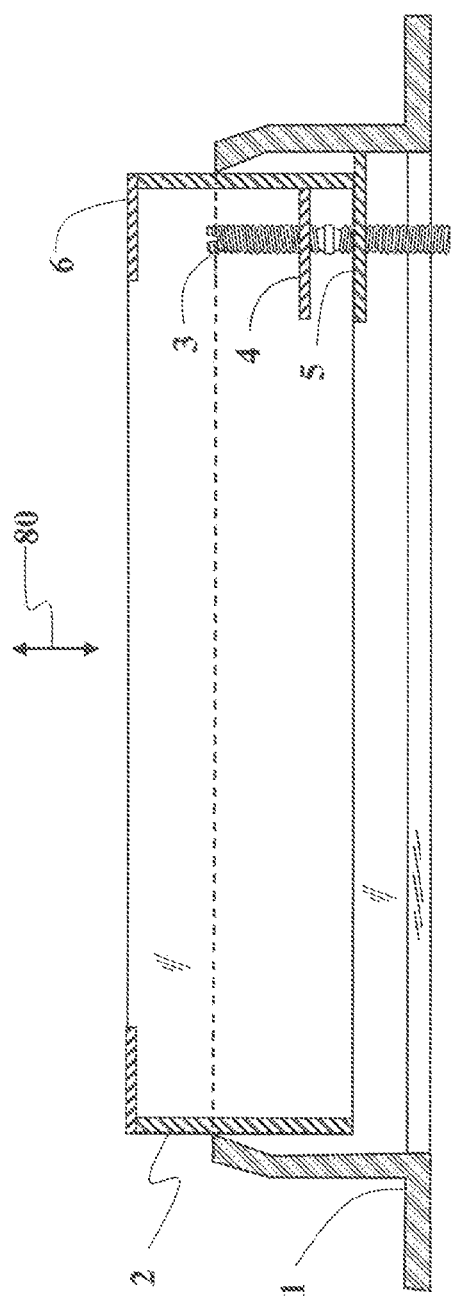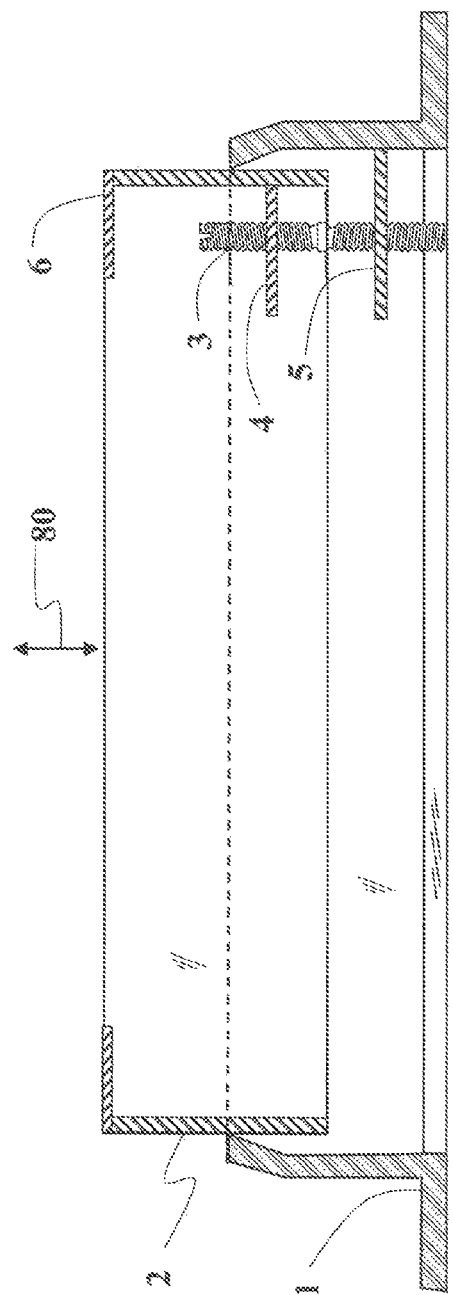
FIG. 2A
FIG. 2B

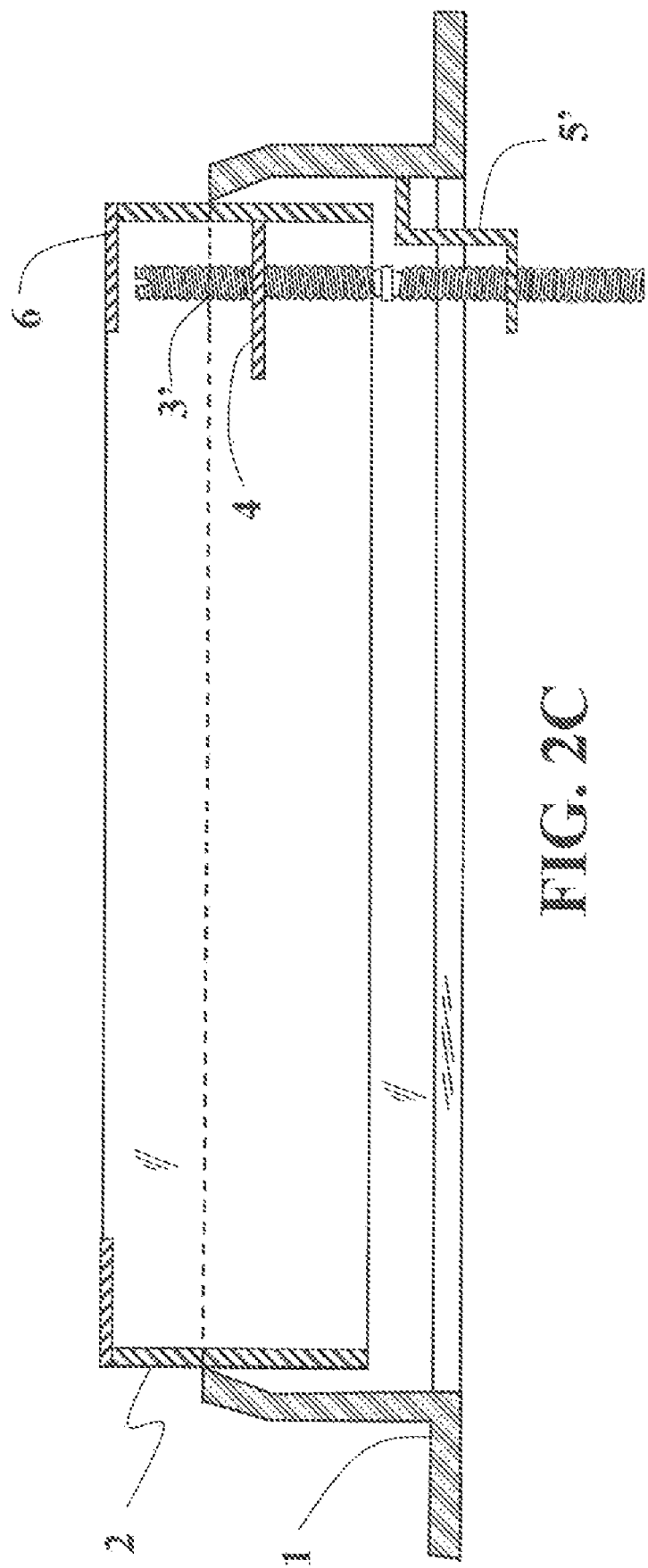

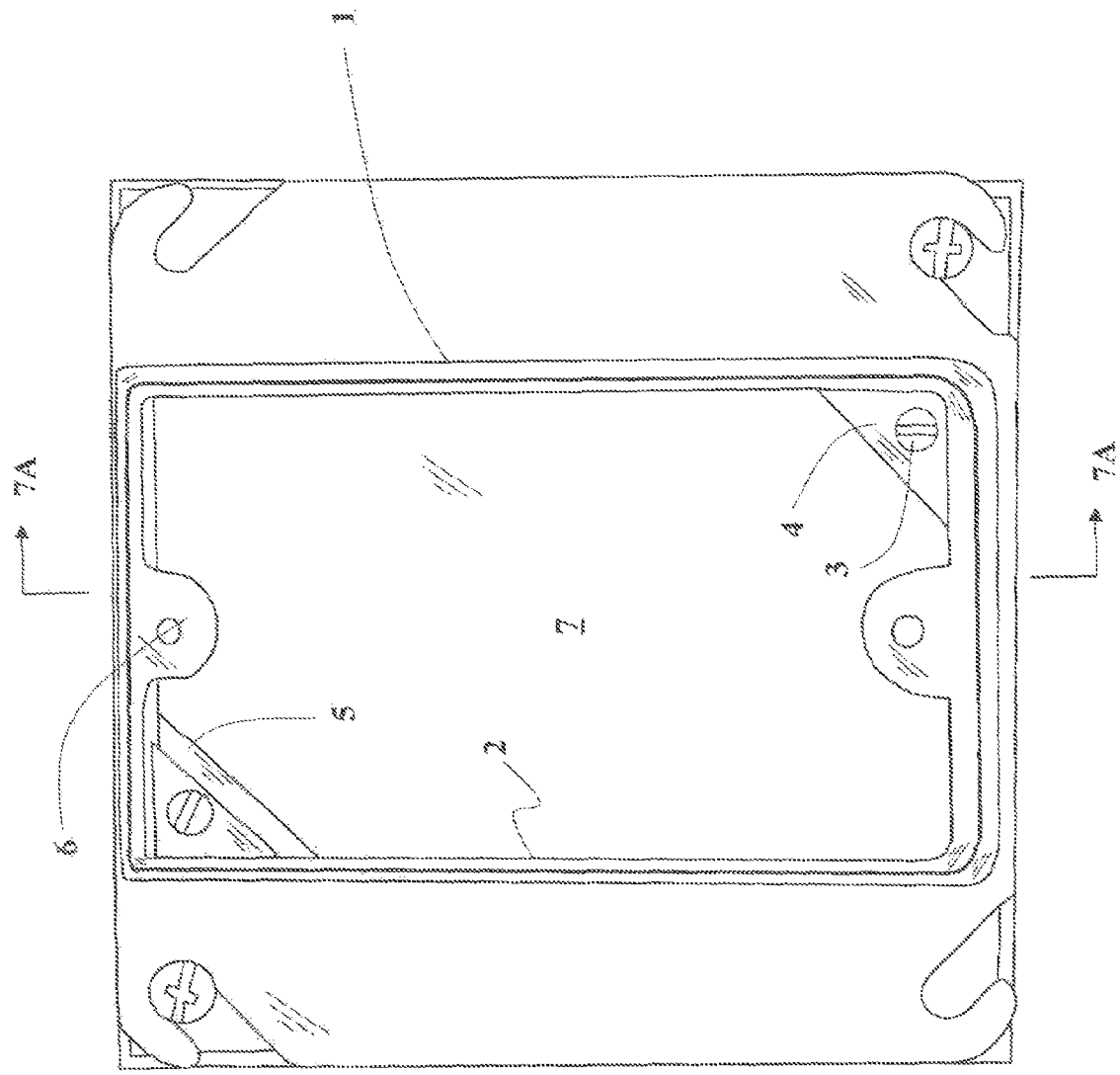

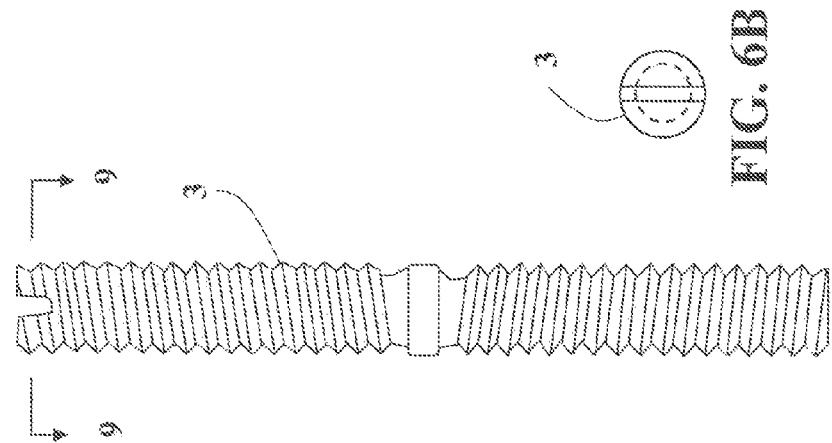
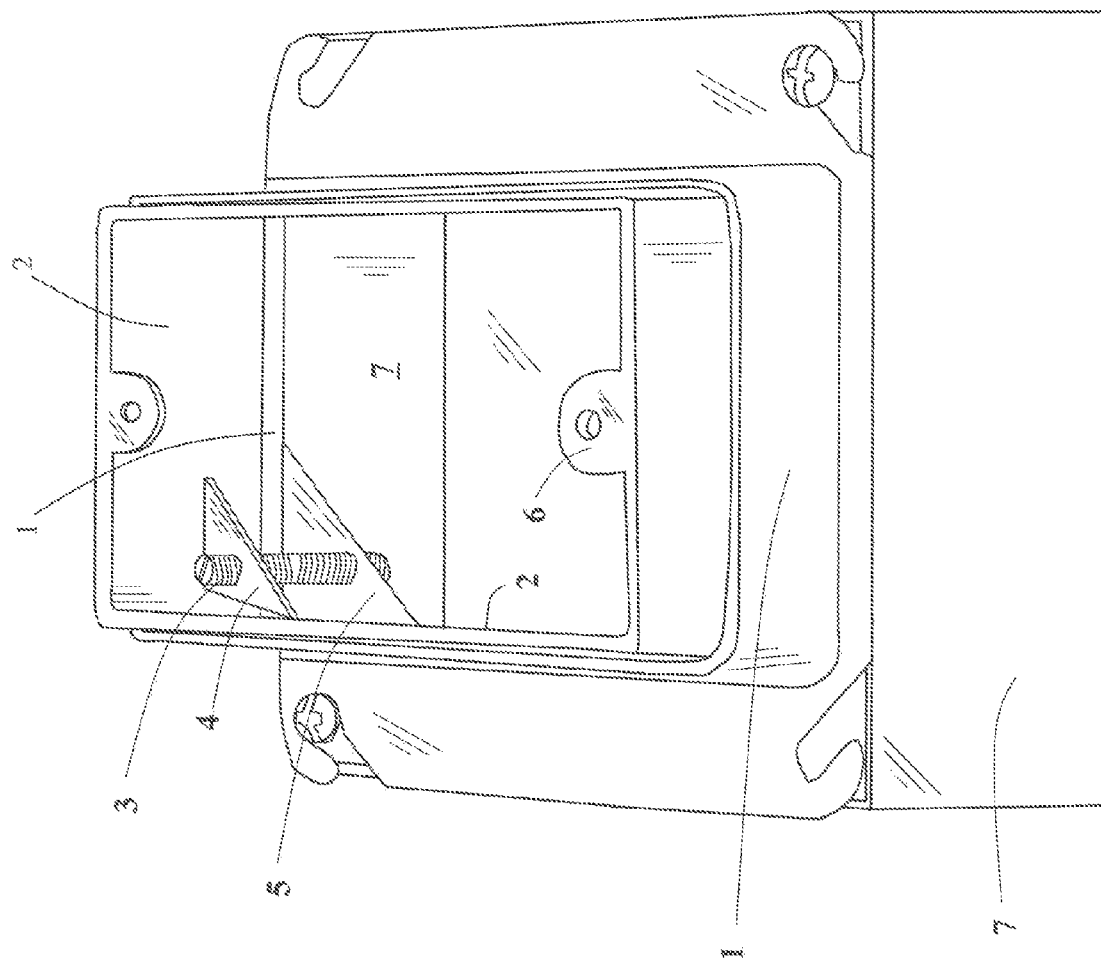

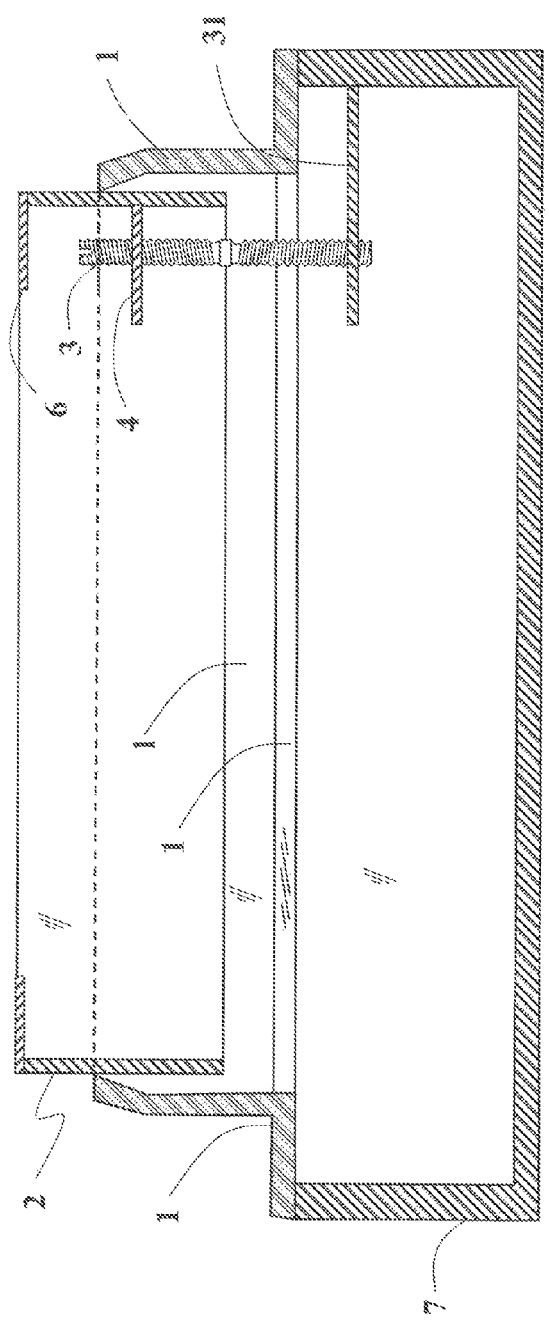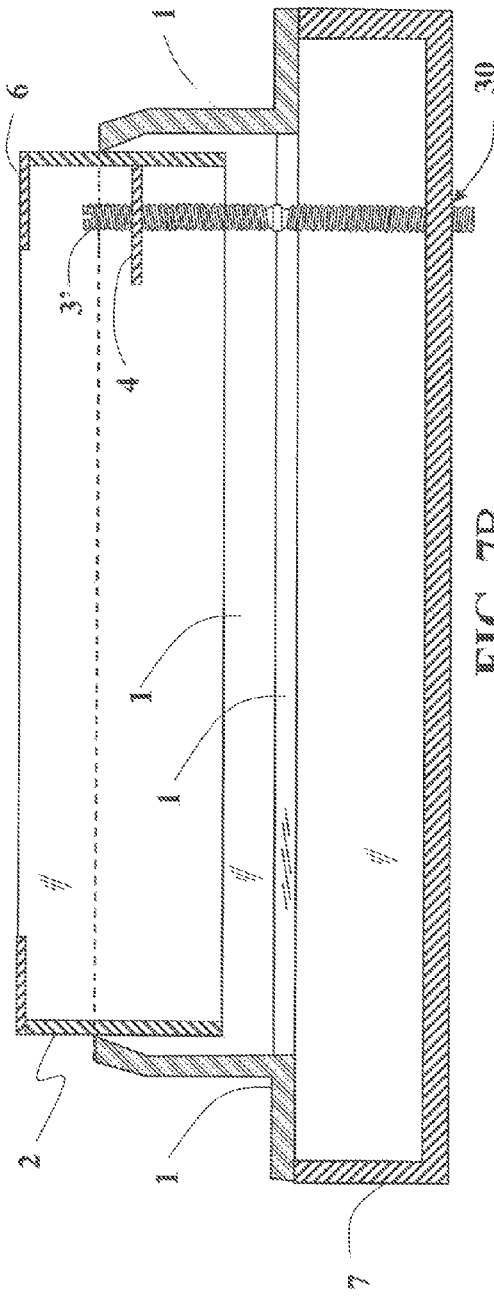
FIG. 7A
FIG. 7B

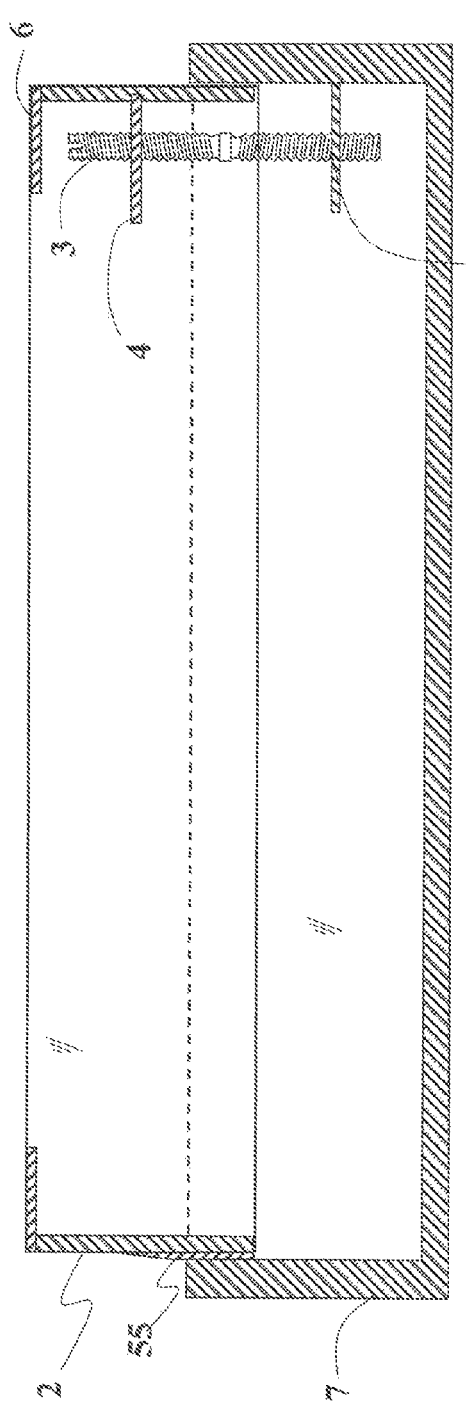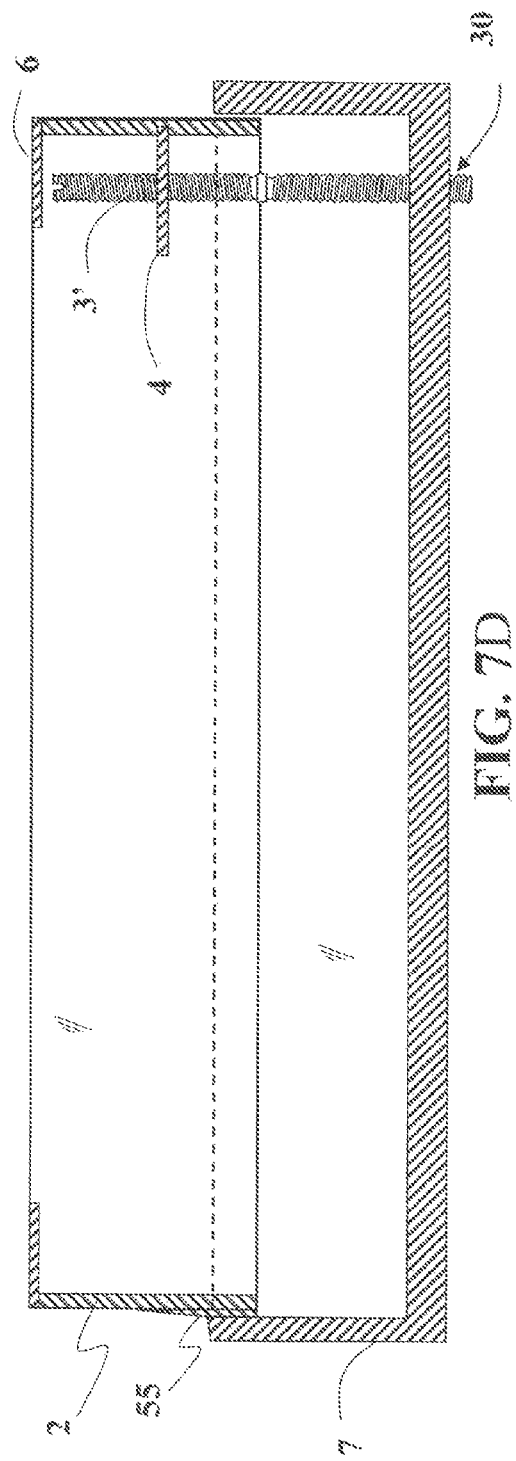

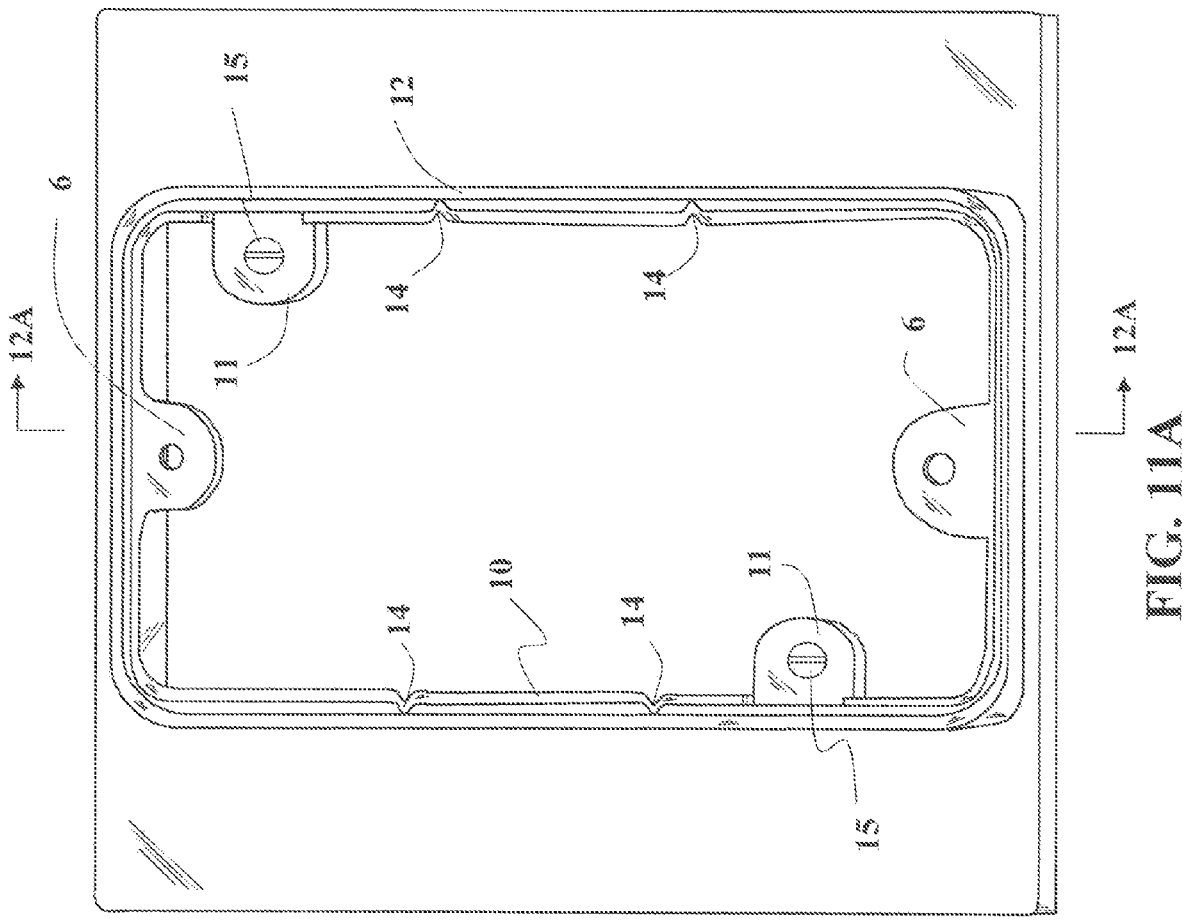

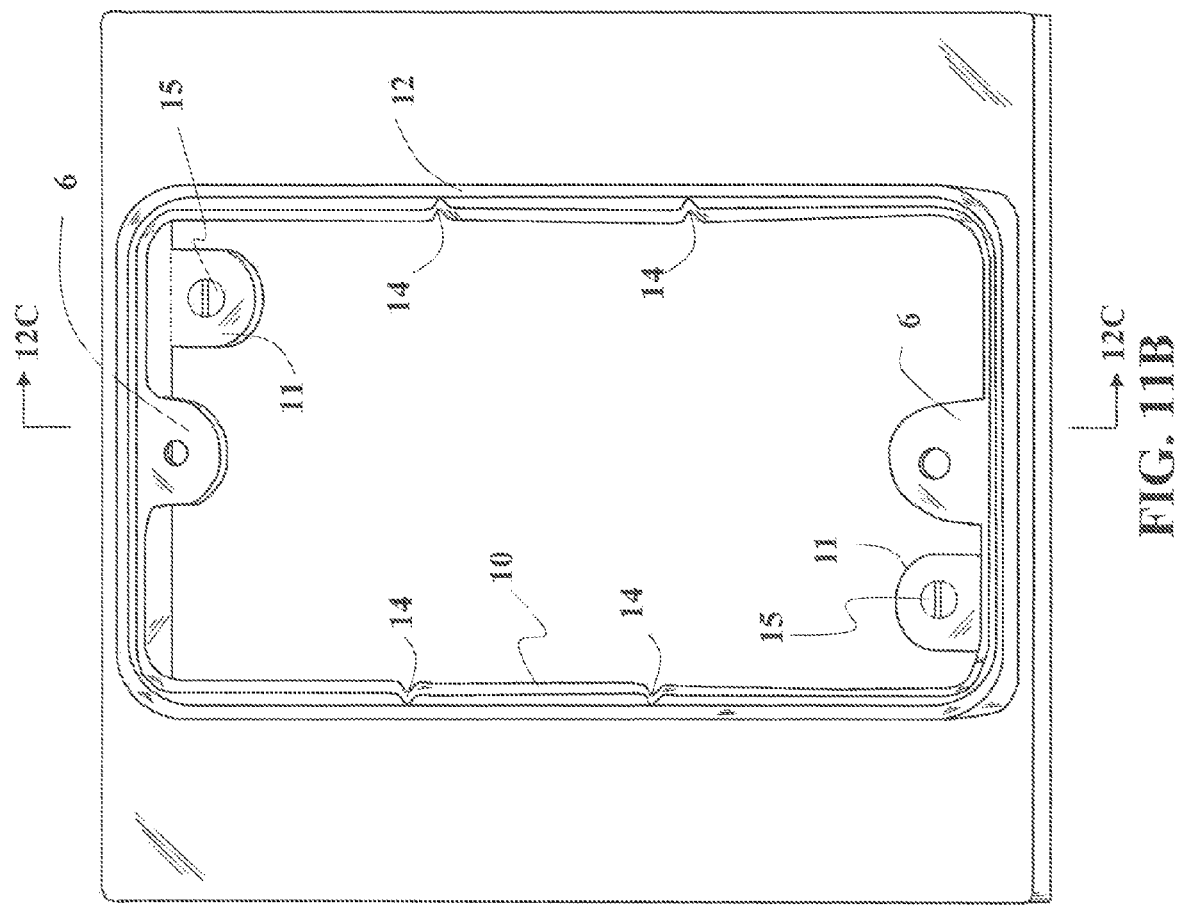

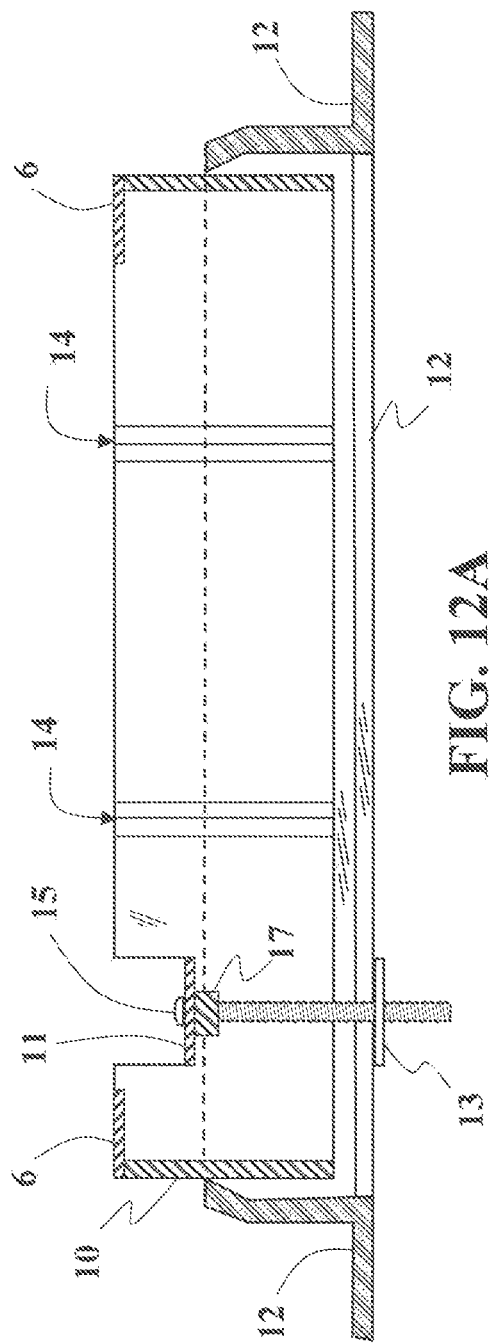
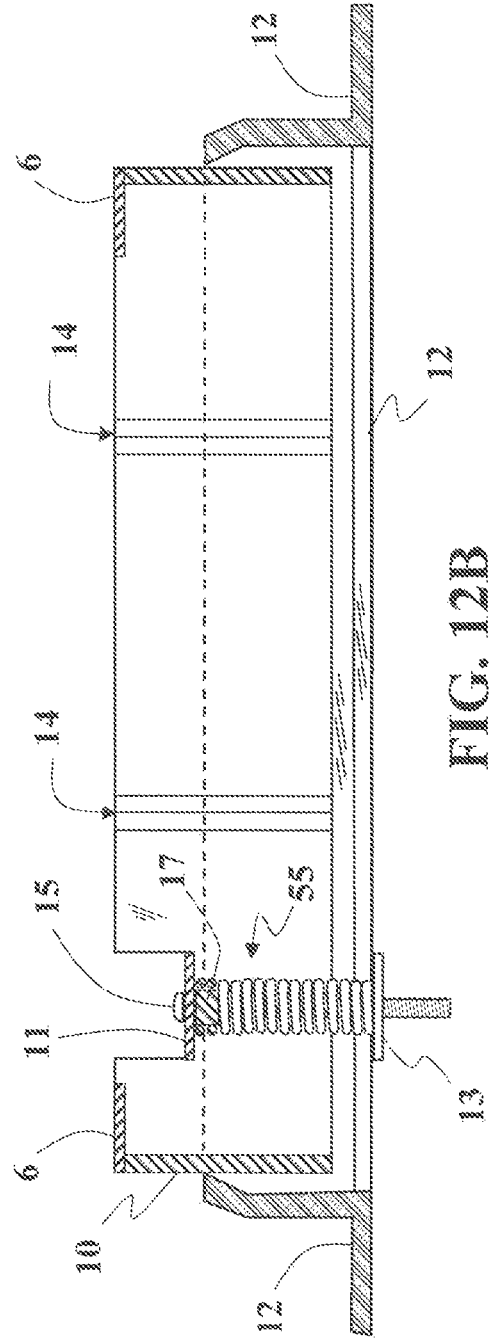
FIG. 12A
FIG. 12B

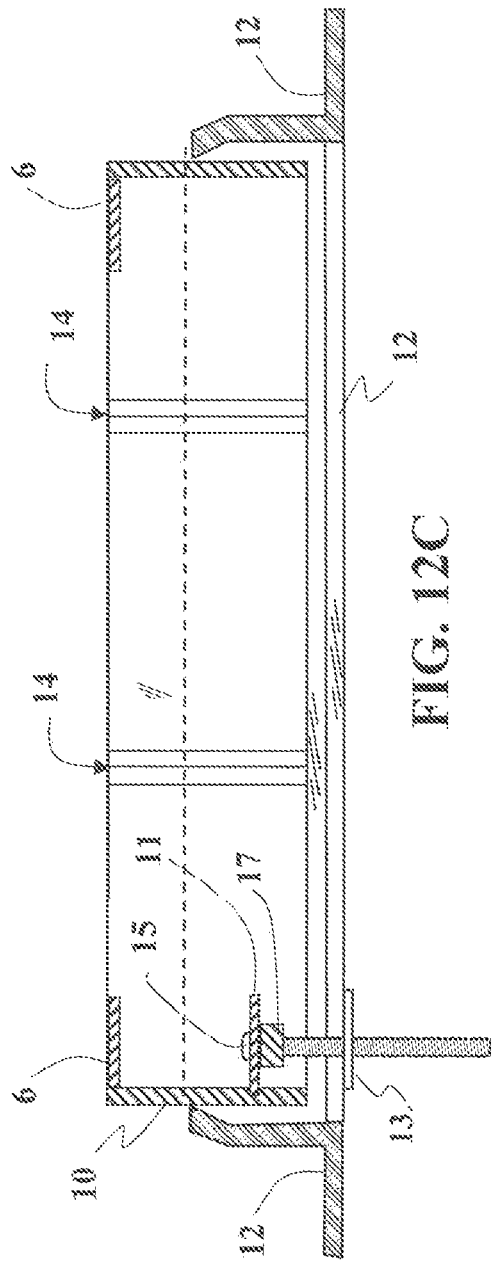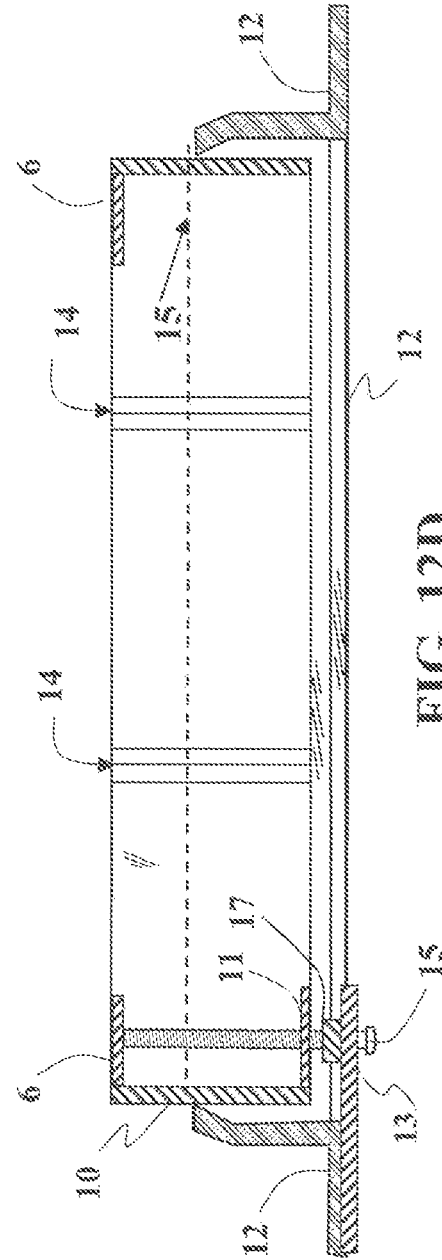

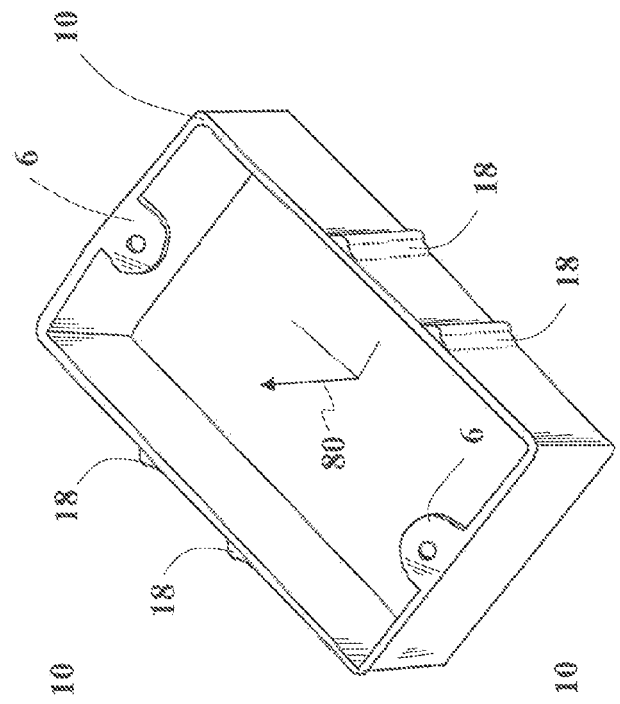
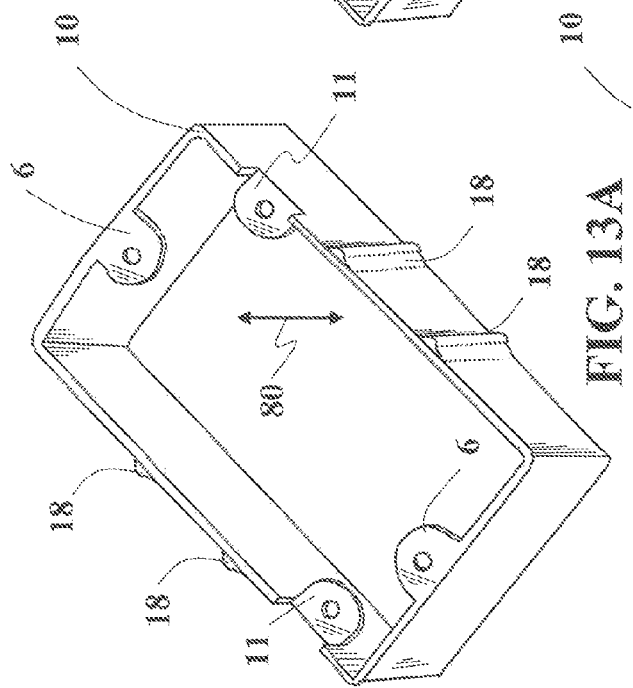
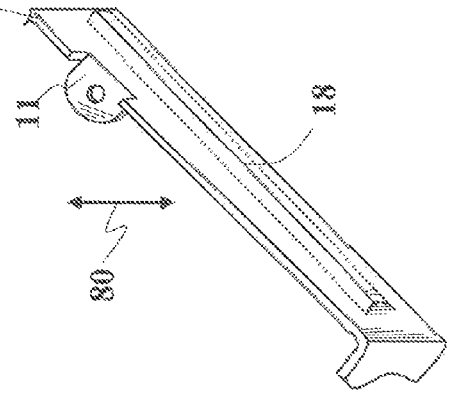

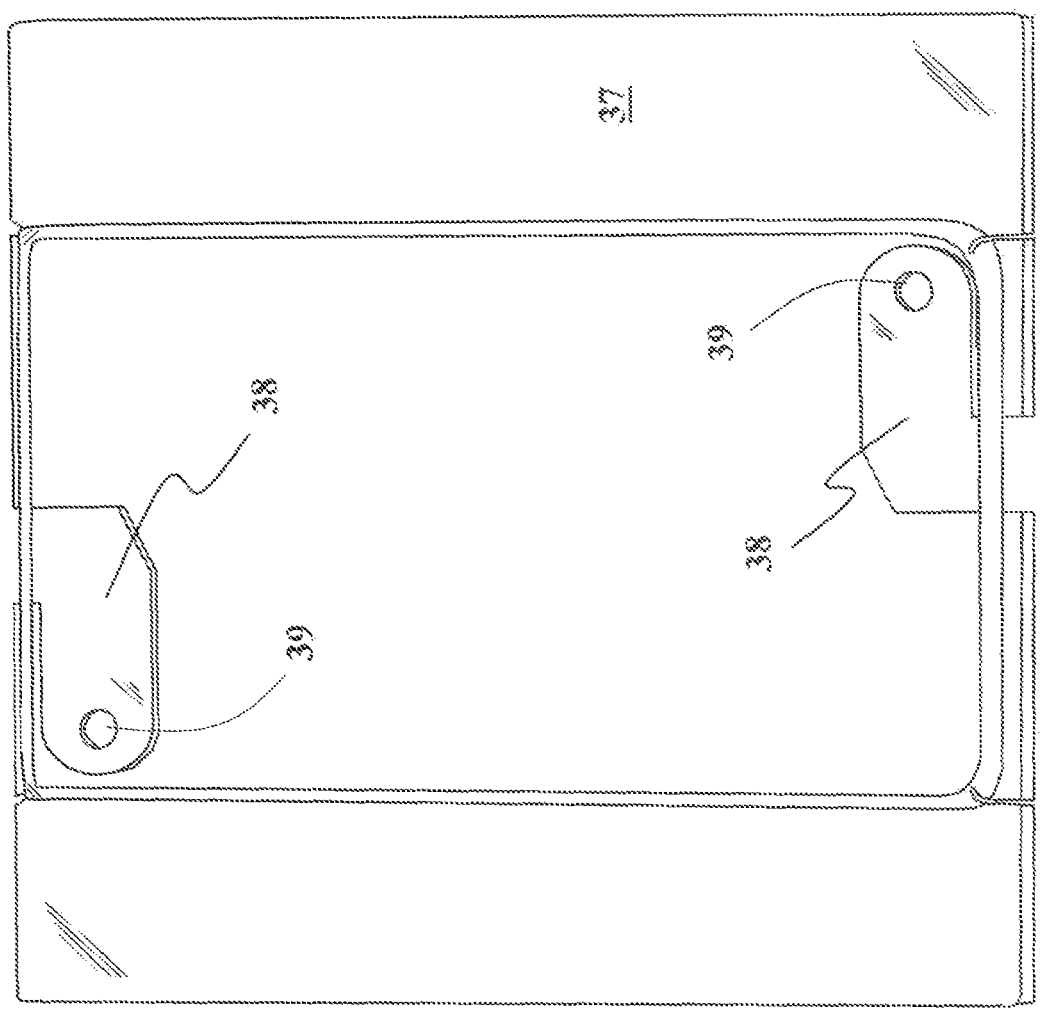

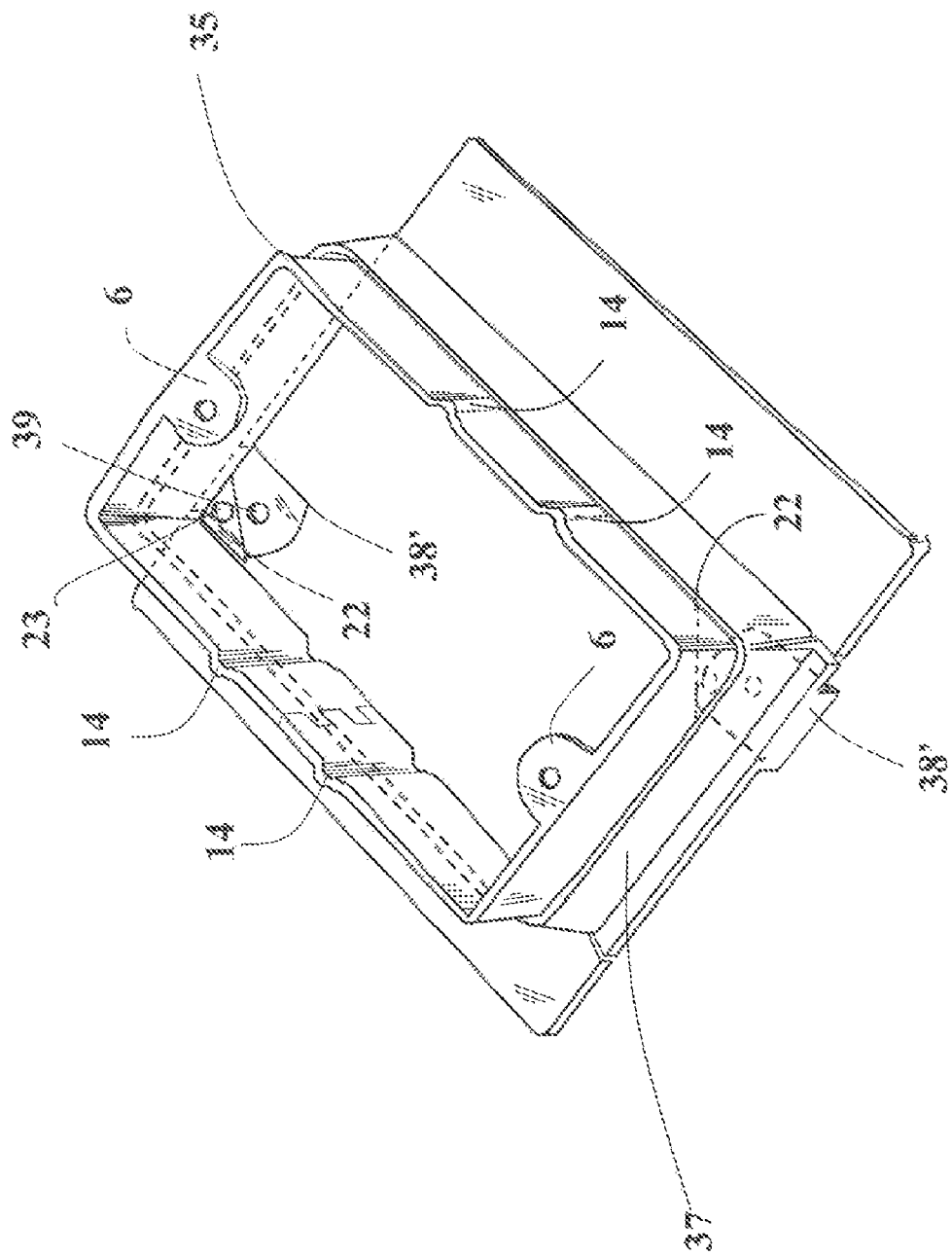

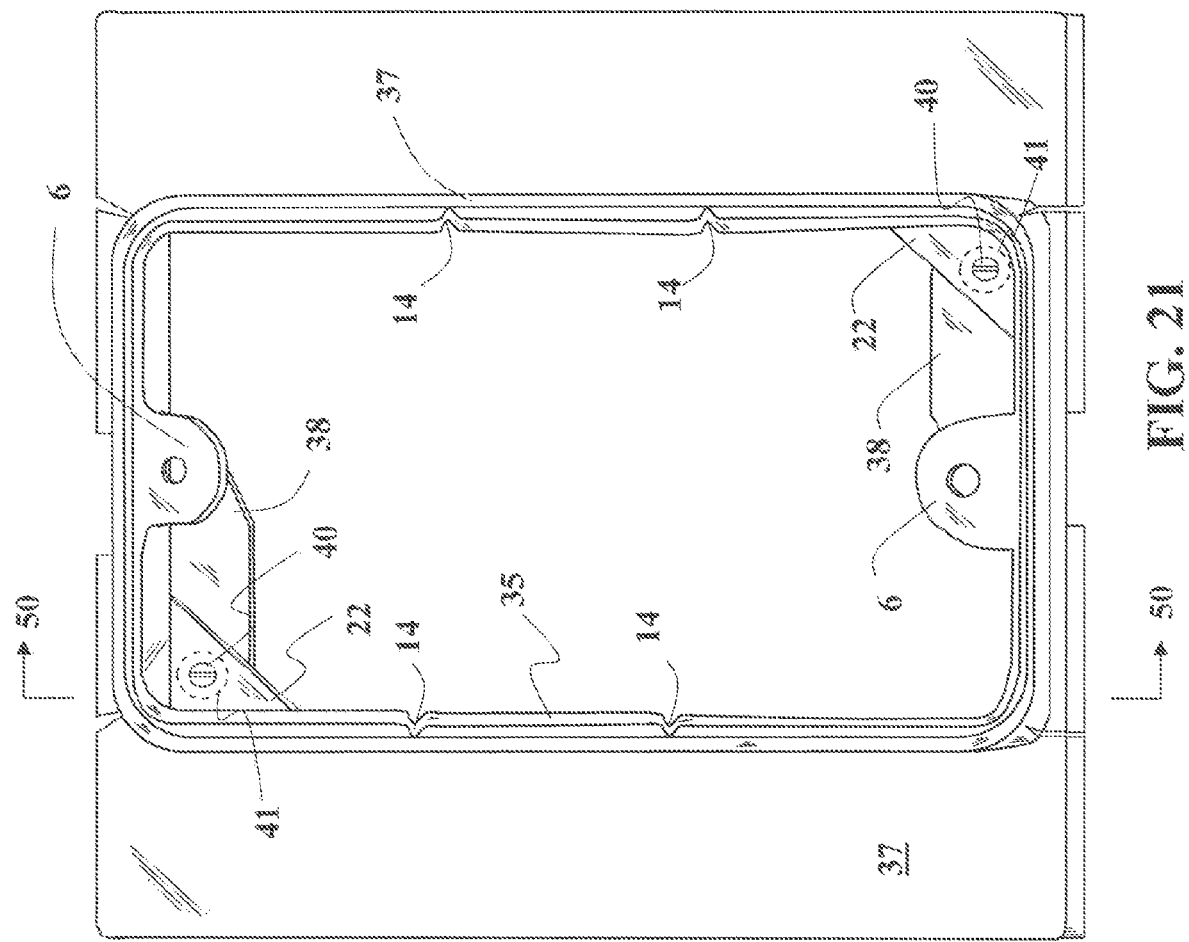

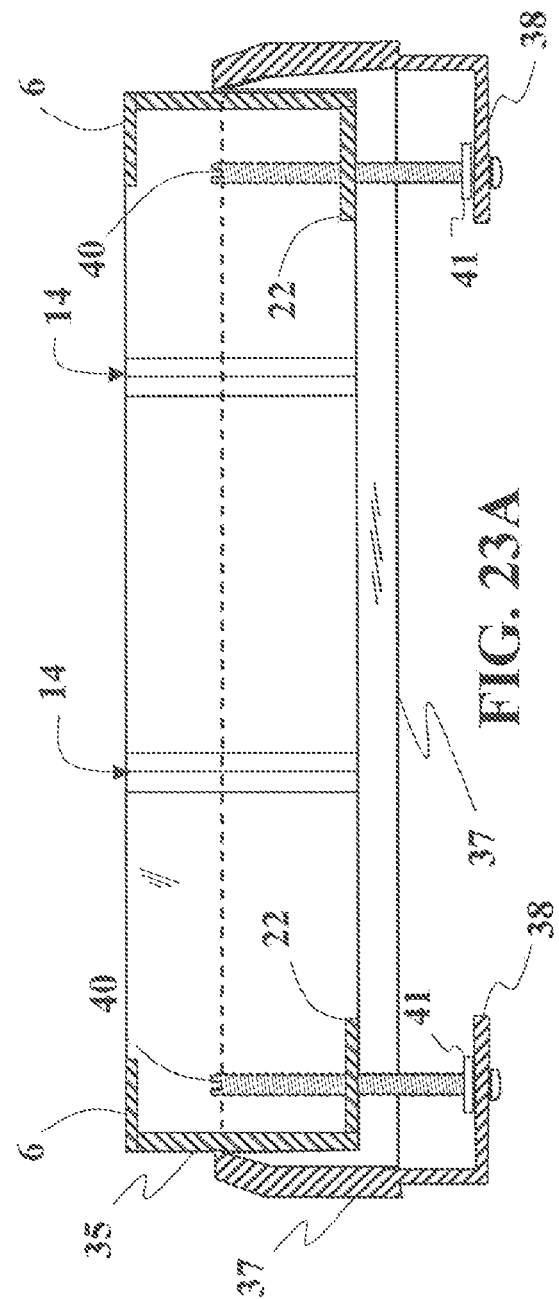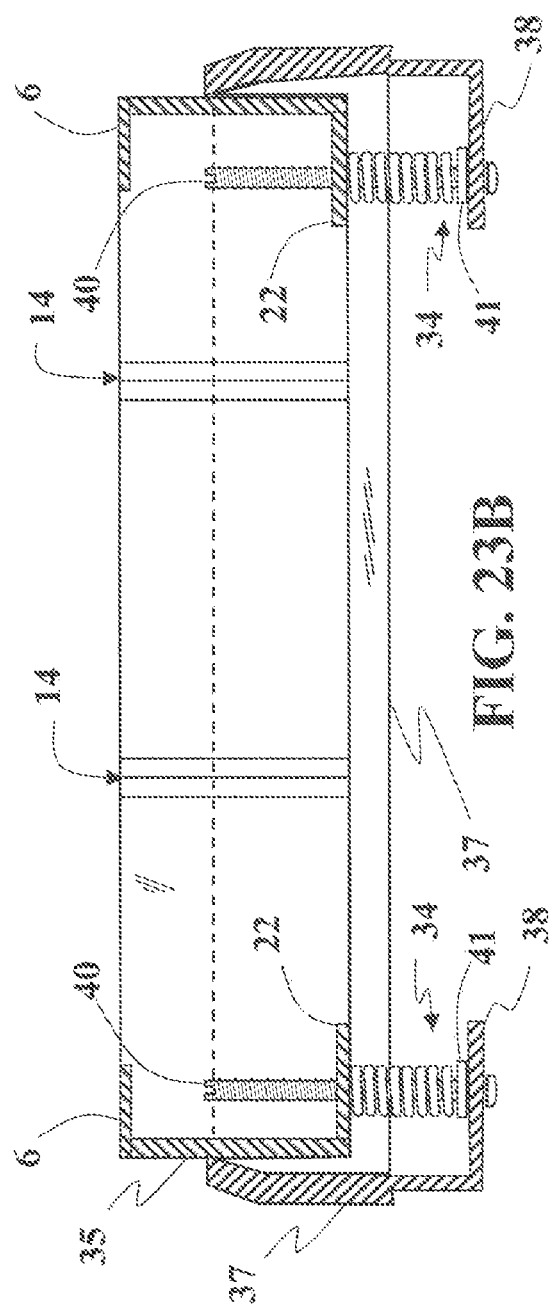

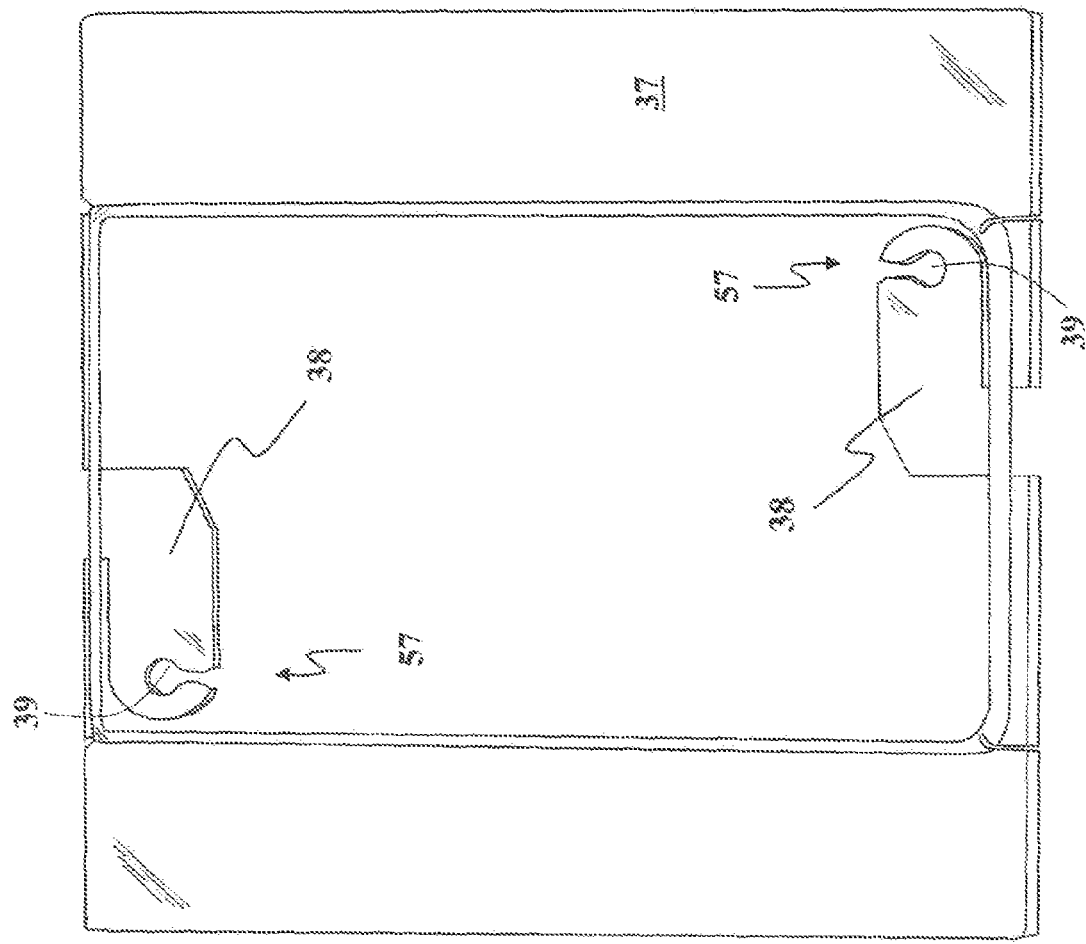

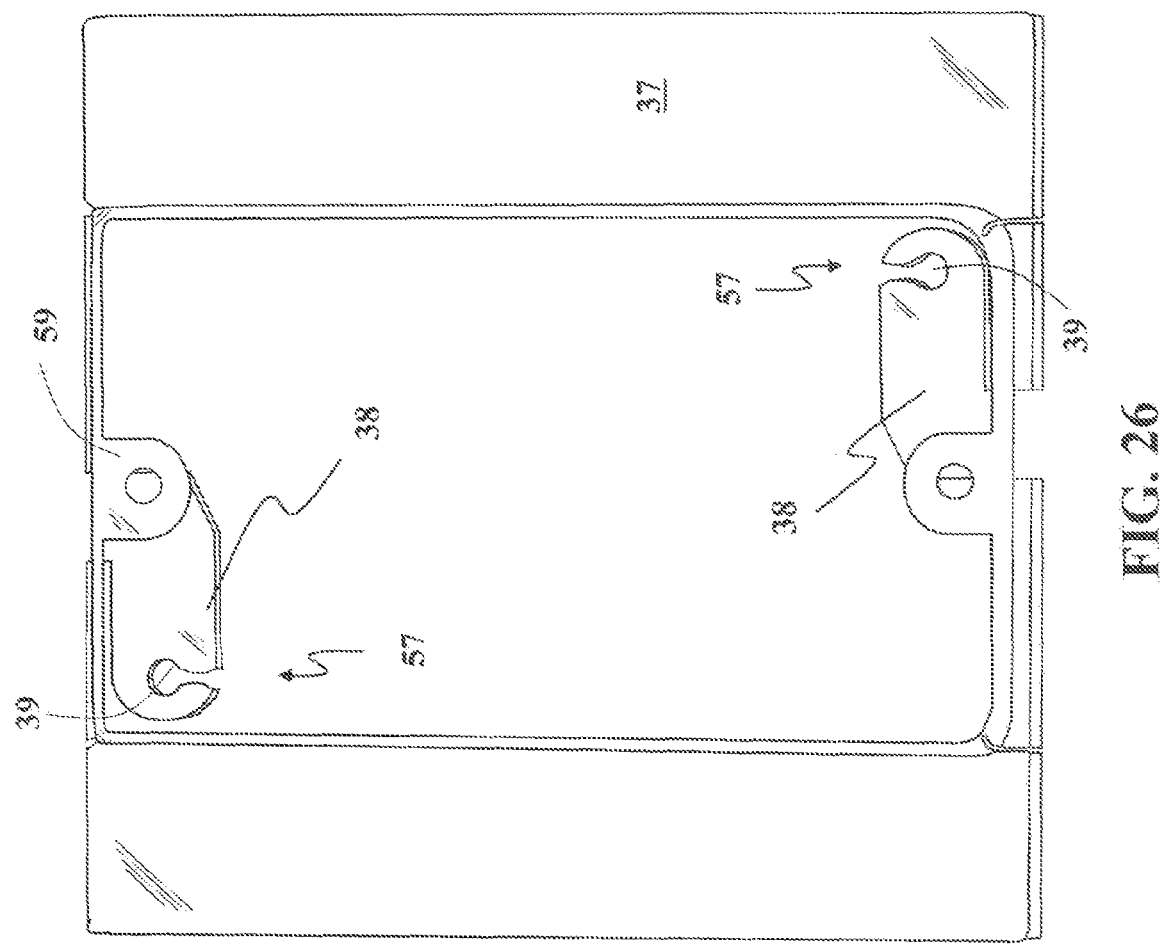

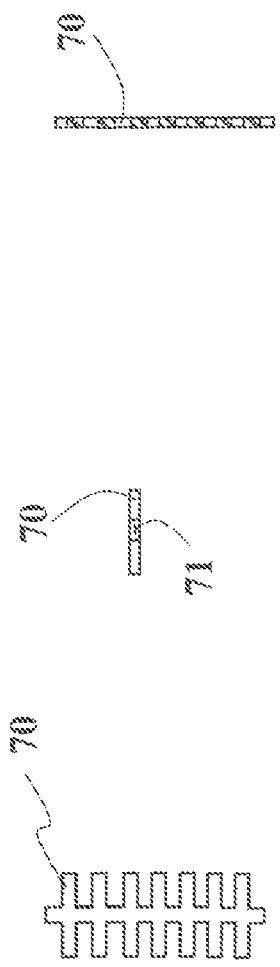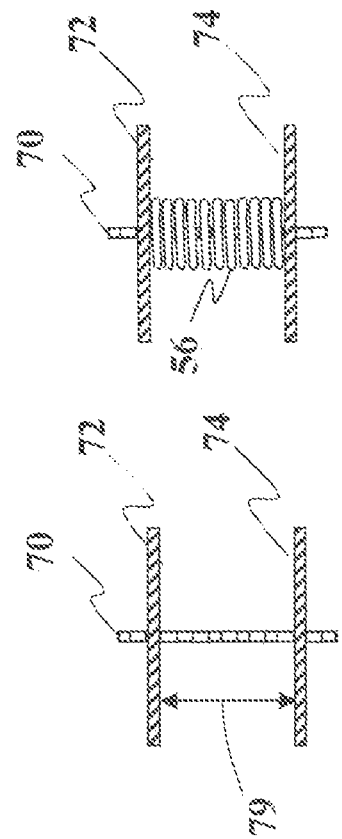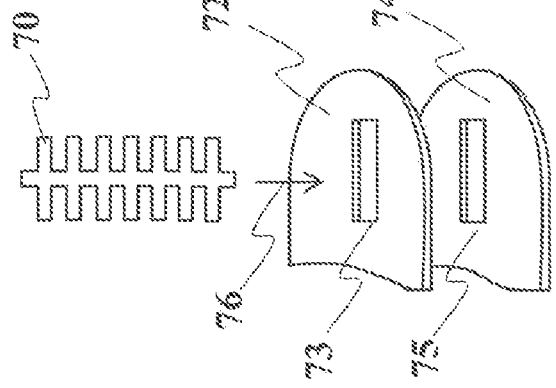
FIG. 31A  FIG. 31B  FIG. 31C  FIG. 31D  FIG. 31E  FIG. 31F  FIG. 31G

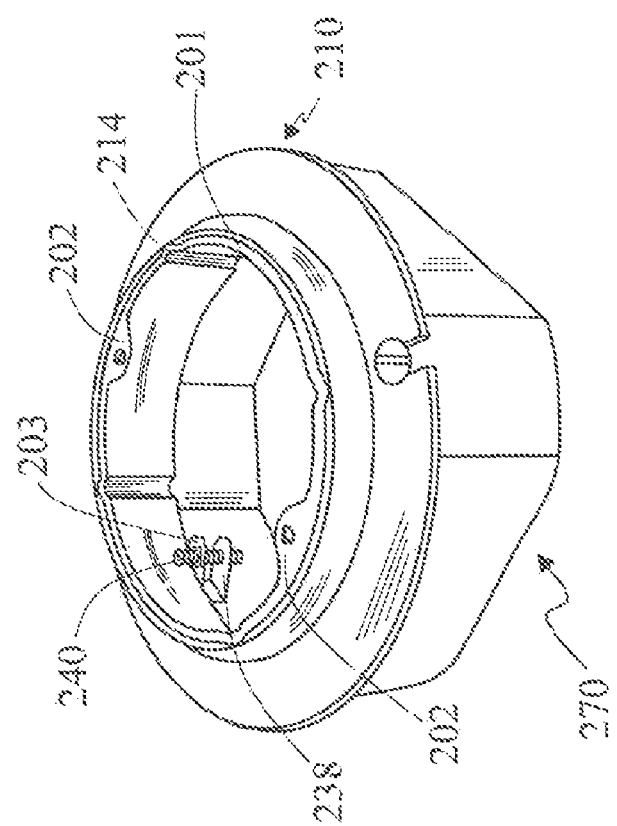
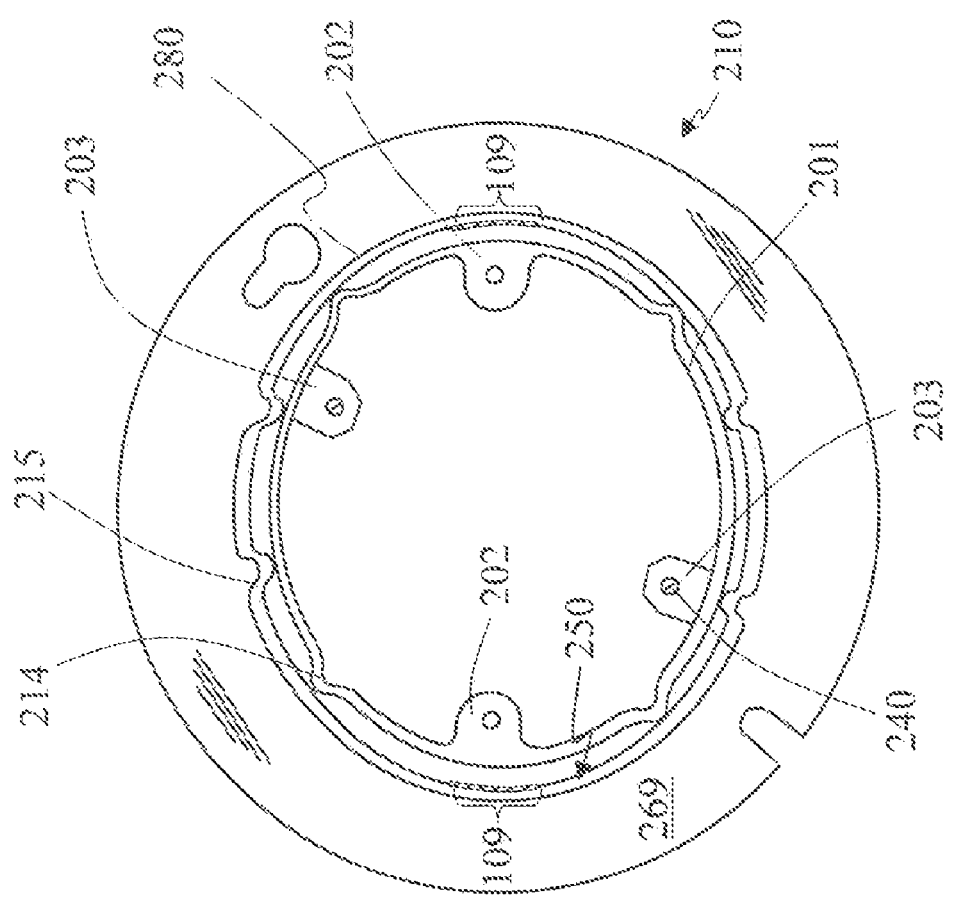

ELECTRICAL BOX EXTENSION

CROSS REFERENCE TO RELATED APPLICATIONS

This application is a continuation of Ser. No. 10/971,921, filed Oct. 21, 2004, which is a continuation-in-part of Ser. No. 10/349,746, filed Jan. 21, 2003, which issued as U.S. Pat. No. 6,820,760 on Nov. 23, 2004, which is a continuation-in-part application of Ser. No. 10/144,210, filed May 13, 2002, now abandoned, which claims the benefit of U.S. Provisional Patent Application No. 60/370,419, filed Apr. 4, 2002.

BACKGROUND

This invention generally relates to electrical equipment for housing electrical devices such as switches and outlets, and particularly to electrical box extensions.

Electrical boxes are commonly used to provide electrical service at convenient locations within buildings. The electrical boxes are commonly formed of plastic or metal and are usually securely fastened by screws or nails to the framework of a structure being prepared for electrification. In newly constructed buildings, the open face of the electrical box, within which an electrical device such as an outlet or switch will be mounted, is usually flush with the surface of the wall or ceiling in which it is installed.

When buildings are renovated or restored or otherwise modified from their original wall and ceiling surfaces, it is common for renovators to lay down new sheet stock such as sheet rock, paneling, and the like, over the existing ceilings or walls. This process of layering causes the existing electrical boxes to become recessed within the built-up wall by the thickness of the new sheet stock. A need for extension therefore occurs when the box or mud ring has been placed and then tile, brick or some other wall covering is added thereby causing the screw mounts for plugs and/or switches to be recessed within the wall.

To solve this problem, box extenders of several different types have been developed. One type relies on a friction fit to hold the box extender in the existing electrical box. This extender does not provide a secure attachment to the existing box and may allow an attached electrical device to slide further within the box as the extender will slide based on an external force.

Another type of extender consists of an extension having walls of approximately the same configuration as the existing box and of fixed depths of extension. The extender is available in several depths to accommodate several different sheet stock thicknesses.

Although there are several depths available, the depth is not continuously variable resulting in an inability to consistently provide a depth extension bringing the existing box flush with the outer wall surface.

Another type of extender includes a body portion having at least one wall and open faces. The extender includes side flanges having holes that align with brackets that are connected to the electrical box. This extender is difficult to use and install as brackets must be firmly attached to the electrical box and then two screws are used to attach each flange of the extender to the electrical box.

There remains a need to extend the electrical box with a minimal number of parts that provide ready height adjustment while maintaining mechanical and structural soundness and electrical connectivity including ground, and thereby compensate for add-ons to a wall that cause depth to be added between the box or ring and the outer wall.

SUMMARY

Disclosed is an electrical box extension including an extending member with one or more fastening brackets, one or more fastening brackets and one or more elevating fasteners such as a double reverse screw or a standard threaded screw with attached grommet for mechanically connecting and, in the case of the double reverse screw electrically connecting, the extending member and the box via the fasteners, brackets, and/or ridges and thereby providing sufficient mechanical resistance to support the adjustable elevation of the extending member and providing a flush surface for surface mounted sockets, switches and their associated plates. Where a standard threaded screw is used or in embodiments without elevating fasteners or without loaded springs, the extending member provides electrical connectivity via one or more protrusions or projections from the sleeve against an electrical box and/or adapting member.

BRIEF DESCRIPTION OF THE DRAWINGS

For a more complete understanding of the present invention and for further features and advantages, reference is now made to the following description taken in conjunction with the accompanying drawings, in which:

FIG. 2A is a cross-sectional view of a reverse screw embodiment of the present invention;

FIG. 2B is a cross-sectional view of a reverse screw embodiment of the present invention in partial extension;

FIG. 2C is a cross-sectional view of an alternative reverse screw embodiment of the present invention;

FIG. 4 is a top view of a reverse screw embodiment of the present invention mounted on an electrical box;

FIG. 5 is a perspective view of a reverse screw embodiment of the present invention mounted on an electrical box;

FIG. 6A is a side view of a reverse screw used in an embodiment of the present invention;

FIG. 6B is a top view of a reverse screw used in an embodiment of the present invention;

FIG. 7A is a cross-sectional view of an alternative embodiment of the present invention having a bracket attached to the electrical box;

FIG. 7B is a cross-sectional view of an alternative embodiment of the present invention engaging an electrical box;

FIG. 7C is a cross-sectional view of an alternative embodiment of the present invention engaging an electrical box;

FIG. 7D is a cross-sectional view of an alternative embodiment of the present invention engaging an electrical box;

FIG. 11A is a top view of an assembly of an alternative embodiment of the present invention;

FIG. 11B is a top view of an assembly of an alternative embodiment of the present invention;

FIG. 12A is a cross-sectional view of an assembly of an alternative embodiment of the present invention;

FIG. 12B is a cross-sectional view of an assembly of an alternative embodiment of the present invention;

FIG. 12C is a cross-sectional view of an assembly of an alternative embodiment of the present invention;

FIG. 12D is a cross-sectional view of an assembly of an alternative embodiment of the present invention;

FIG. 13A is a perspective view of an extending member of an alternative embodiment of the present invention;

FIG. 13B is a perspective view of an extending member portion of an alternative embodiment of the present invention;

FIG. 14 is a perspective view of an extending member of an alternative embodiment of the present invention;

FIG. 19 is a top view of a mud ring member of an alternative embodiment of the present invention;

FIG. 20B is a perspective view of an extending member within an adapting member of an alternative embodiment of the present invention;

FIG. 21 is a top view of an assembly of an alternative embodiment of the present invention;

FIG. 22 is a top view of a washer of an alternative embodiment of the present invention;

FIG. 23A is a cross-sectional view of an assembly of an alternative embodiment of the present invention;

FIG. 23B is a cross-sectional view of an assembly of an alternative embodiment of the present invention;

FIG. 24 is a top view of an adapting member of an alternative embodiment of the present invention;

FIG. 26 is a top view of an adapting member of an alternative embodiment of the present invention;

FIG. 31A is a front view of an elevating fastener of an alternative embodiment of the present invention;

FIG. 31B is a top view of an elevating fastener of an alternative embodiment of the present invention;

FIG. 31C is a side view of an elevating fastener of an alternative embodiment of the present invention;

FIG. 31D is a perspective view of an elevating fastener proximate to receiving brackets of an alternative embodiment of the present invention;

FIG. 31E is a perspective view of an elevating fastener within receiving brackets of an alternative embodiment of the present invention;

FIG. 31F is a perspective view of an elevating fastener engaged between receiving brackets of an alternative embodiment of the present invention;

FIG. 31G is a perspective view of an elevating fastener engaged between receiving brackets of an alternative embodiment of the present invention;

FIG. 38 is a top view of an assembly of an alternative embodiment of the present invention wherein the tabs or brackets of the mud ring have been removed;

FIG. 39 is a perspective view of an extending member within an adapting member of an alternative embodiment of the present invention;

DETAILED DESCRIPTION OF THE INVENTION

The extending member, or sliding tubular member, is an attachable or otherwise adjustable element of an assembly comprised of the extending member and a mud ring, adapting member or electrical box. A first embodiment has at least two sets of mounting brackets, placed in each of two diametrically opposed corners. One bracket is placed at the base of the ring and extends into the open portion of the ring. The second bracket is preferably placed proximate to the base of the extending member to maximize screw/extending member travel. An alternative embodiment has the second bracket approximately midway between the base and top of the extending member. Each bracket has a tapped entry for a combination left-right thread screw. By turning either screw, the extension is elevated or lowered such that the outer edge of the extension is made substantially flush with the wall surface. The design of the brackets and screw mounting effects a solid ground and satisfies the electrical grounding requirements. Embodiments without the fasteners use protrusions from the extension and/or the ring to maintain the electrical grounding. Additional sets of mounting brackets may be required depending primarily upon the ring/box size. For example, an example two-gang article has mounting brackets on the middle portion of each of the opposite inner sides of the adapting member.

Figure 1:
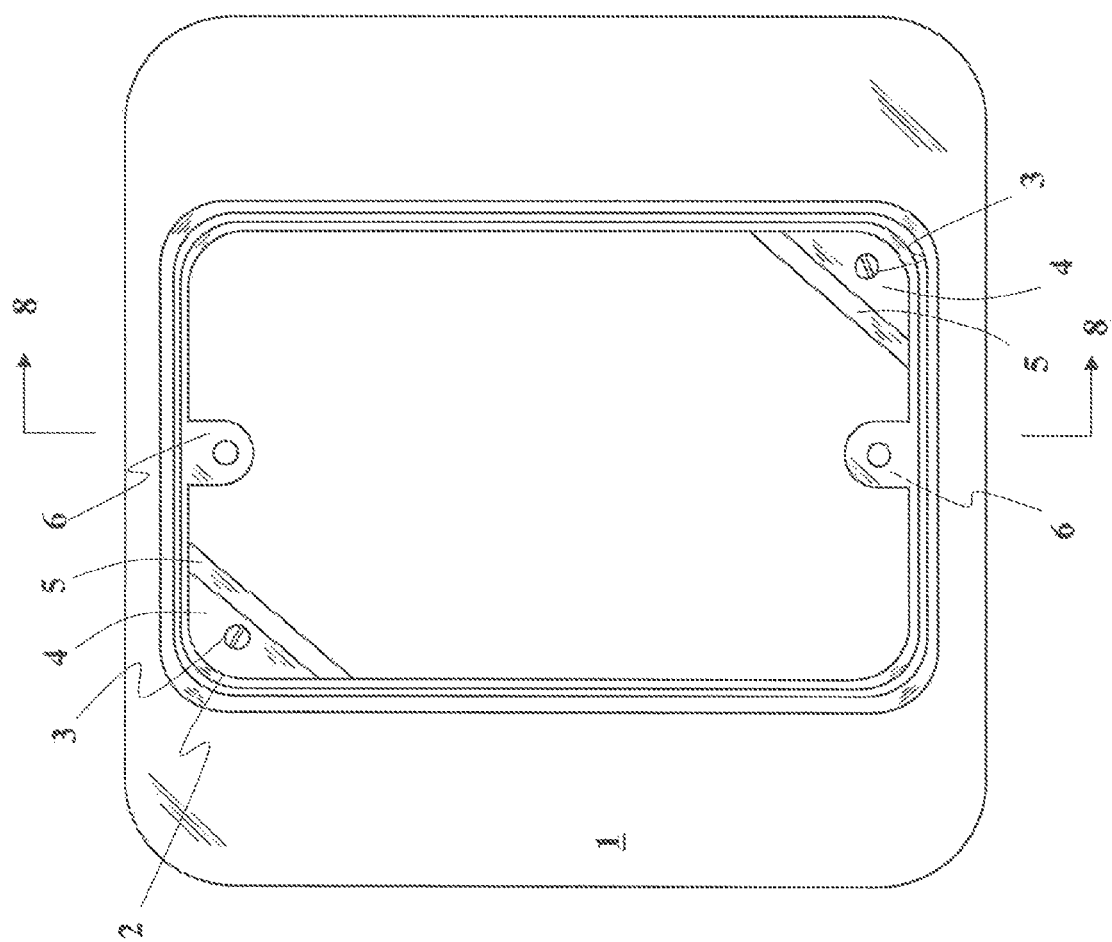
FIG. 1 is a top view of a reverse screw embodiment of the present invention.

FIG. 1 illustrates the upper screw mounting plates 4 or brackets and lower screw mounting plates 5 or brackets of the present invention that are placed such that fastener such as a reverse thread screw 3 connects the at least two brackets, the upper bracket 4 and the lower bracket 5, and when rotated, the screw 3 works to lower and raise the sleeve or extending member 2 relative to the mud ring or adapting member 1. While a reverse thread screw 3 is shown as the fastener, other fasteners of adjustable height that provide mechanical and electrical connectivity may be substituted. The extending member 2, extension or sleeve is shown is a tubular member with a transversal shape that is substantially rectangular. The transversal shape of the extension may also be circular, oval or multifaceted depending upon the adapting member to which it is attached. The switch/plug screw plates 6 are a part of the extension 2 or the extension 2 is embodied alternatively such that the end portions of the extension 2 fit about the plates 6. In the preferred embodiment, the lower bracket 5 is fixedly attached to the adapting member 1. Alternatively, the lower bracket 5 may be fixedly attached to an electrical box (not shown) or similar housing.

FIG. 2A is a cross-sectional view 8 of FIG. 1 that illustrates the manner in which a screw 3 engages the upper mounting bracket 4 and lower mounting bracket 5. The lower bracket 5 is fixedly attached to the mud ring or adapting member 1. The upper bracket 4 is fixedly attached to the sleeve, extension, or extending member 2. By turning the one or more screws 3, the extension 2 rises or falls along the axis of extension and retraction 80 or principal axis of extension depending upon the direction of turn of the one or more screws 3. An extending member elevated with respect to the adapting member is illustrated in FIG. 2B. An alternative embodiment illustrated in FIG. 2C, the lower bracket 5' is attached to the ring 1, but configured with an extending portion to support greater screw travel and longer reverse thread screws 3'.

Figure 3:
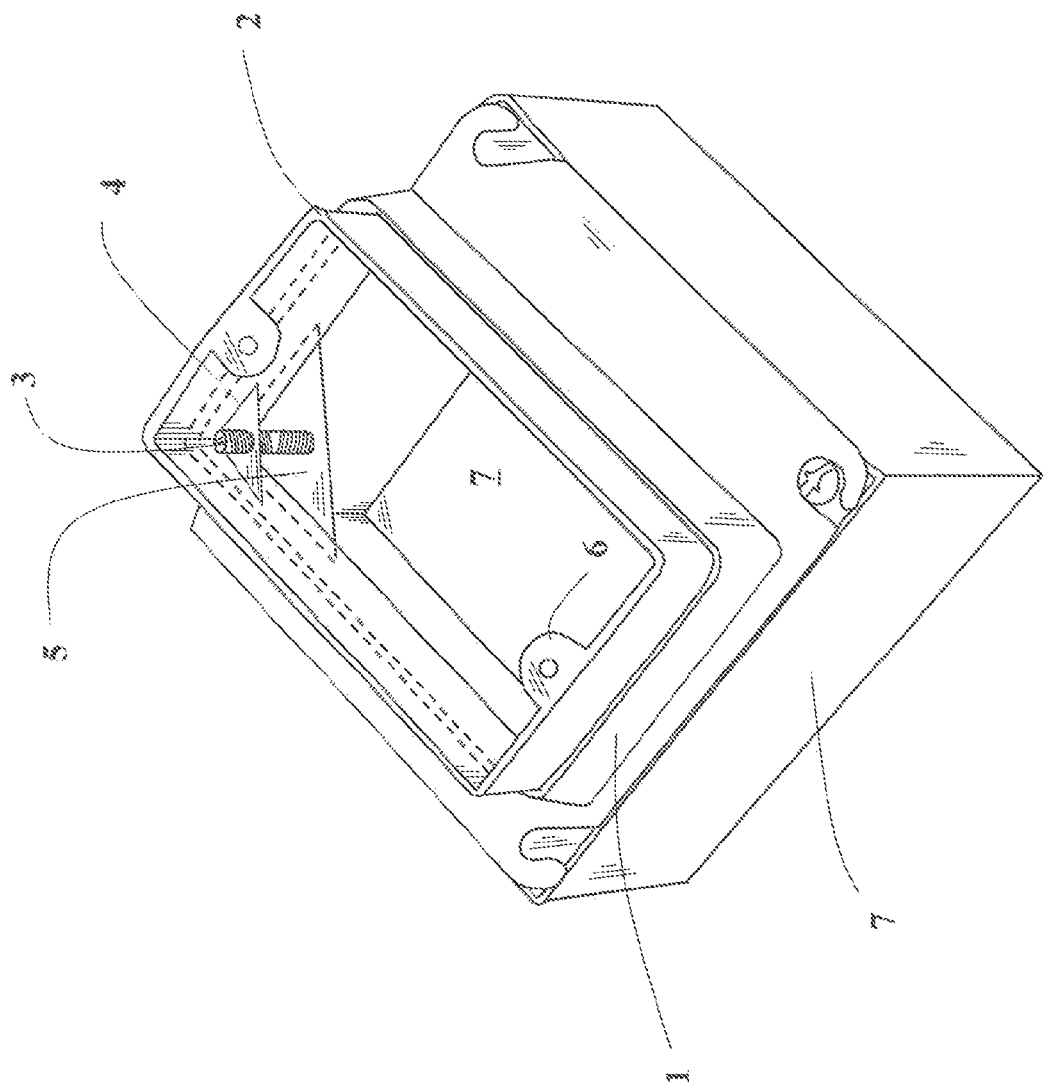
FIG. 3 is a perspective view of a reverse screw embodiment of the present invention mounted on an electrical box.

FIGS. 3-5 illustrate an embodiment of the present invention from various perspectives as it is mounted on an electrical box 7. FIG. 3 provides a perspective view of an embodiment of the present invention mounted on an electrical box 7. The extending member 2 is shown within the flange of the adapting member 1. A screw 3 as an example fastener is visible mechanically connecting the extension 2 to the ring 1 by way of a lower bracket 5 fixedly attached to the ring 1 and an upper bracket 4 fixedly attached to the extending member 2. The upper and lower brackets are also referred to as a set or pair of brackets 4 and 5. FIG. 4 provides a top view of the present invention mounted on an electrical box and shows the preferred embodiment with a screw 3 and pair of brackets 4 and 5 diagonally opposed from a second screw 3 and pair of brackets. The lower bracket 5 may, in an alternative embodiment, be fixedly attached to the box 7 and is illustrated below (FIG. 7A) in cross-sectional view 7A. FIG. 5 is a perspective view of an embodiment of the present invention mounted on an electrical box and illustrating a typical travel of the extending member 2 relative to the remaining screw thread.

In the preceding example embodiment, fasteners are used to provide mechanical and electrical contact and provide for the adjusting of the sliding or extending member. FIGS. 6A and 6B illustrate side and top views 9 of the reverse thread screw 3 of an embodiment of the present invention. The screw length selected depends upon the particular embodiment used as is described in detail below.

Rather than the one or more lower brackets 5 (FIG. 2A) being fixedly attached to the ring 1, in an alternative embodiment of the present invention, the one or more lower brackets 5 (FIG. 2B) are fixedly attached to the box 7 shown in FIG. 7A in cross-section view of FIG. 4. The extending member 2 remains in electrical and mechanical contact with the box by way of the one or more screws 3 as disclosed above by engaging the one or more upper brackets 4 and the one or more lower brackets 31. Depending on the dimensions of the box 7 relative to the extending member 2, a ring 1 or other adapting member thereby becomes optional in this alternative embodiment as a separate member and otherwise the functionality of the ring 1 is taken on by the box 7. An alternative embodiment illustrated in FIG. 7B has at least one tapped aperture 30 of the electrical box 7 rather than the one or more lower brackets 31 for engaging the screw 3'. FIG. 7C illustrates an embodiment where in place of an adapting member or ring, the electrical box has a mounting surface or bracket 31 and the extending member or slider 2 is in close proximity to the walls of the box 7. Mechanical contact and electrical contact illustrated in FIGS. 7C and 7D are enhanced where the embodiments include one or more protrusions 55 from the slider 2 outer surface contacting at least one of the inside walls of the box 7.

Figure 8:
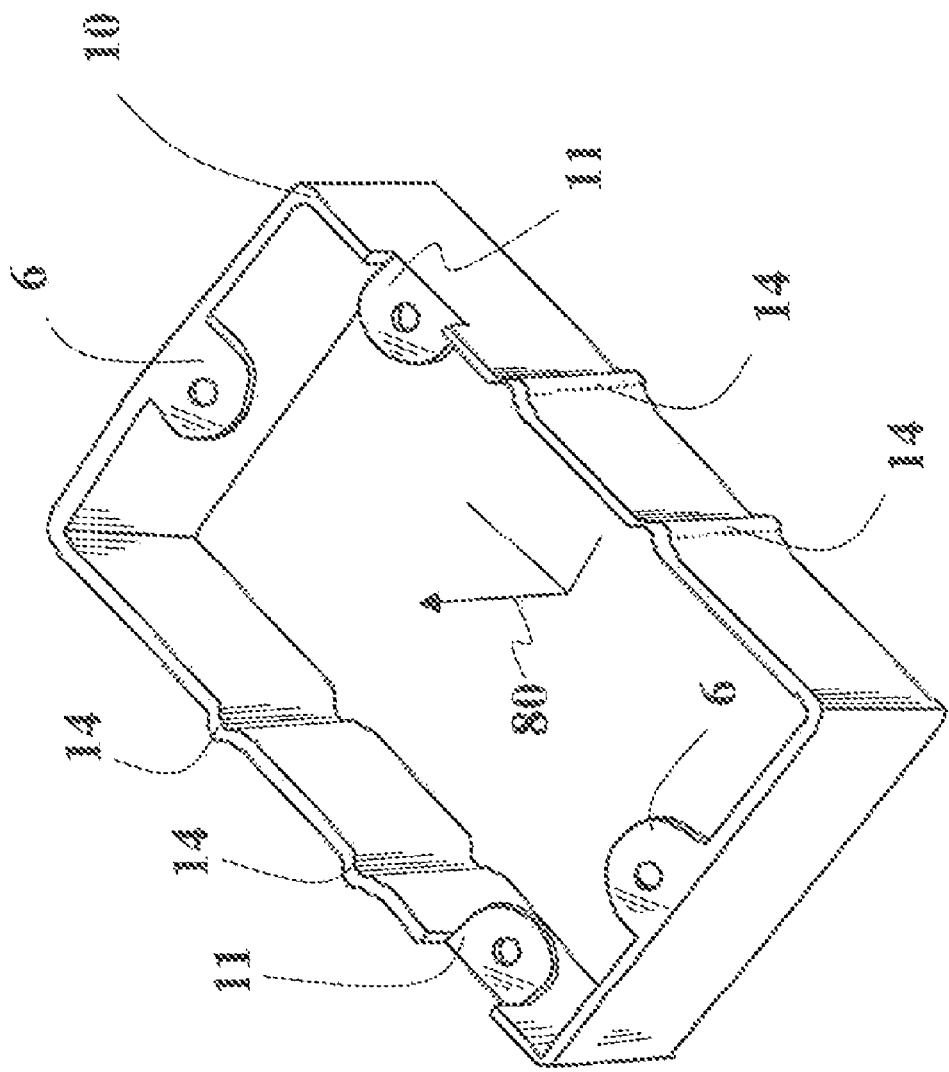
FIG. 8 is a perspective view of an extending member of an alternative embodiment of the present invention.
Figure 9:
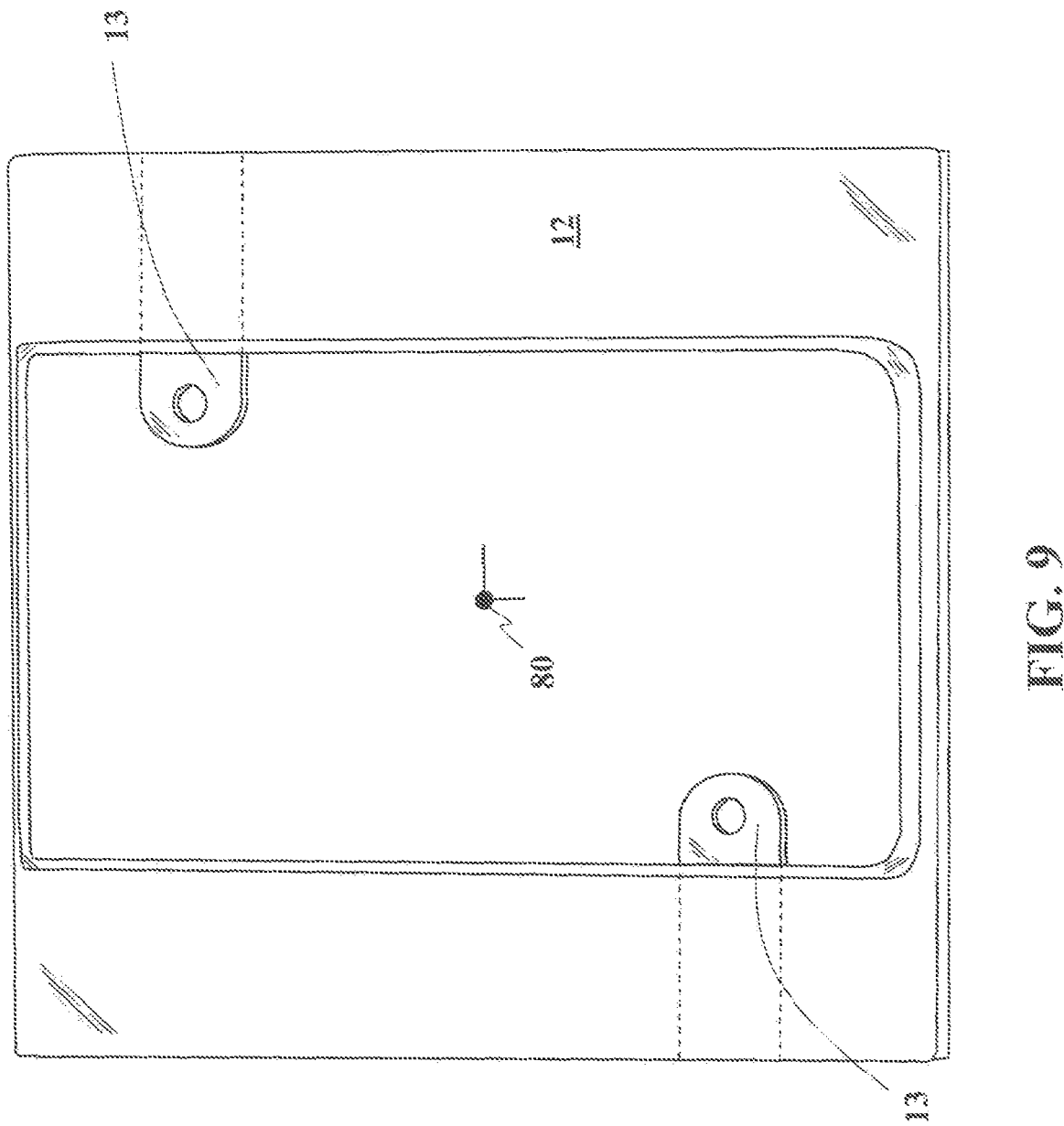
FIG. 9 is a top view of a mud ring member of an alternative embodiment of the present invention.

An alternative embodiment of the present invention illustrated in FIG. 8 has a sliding member 10 with a plurality of protrusions 14 stamped into the sliding member wall. The protrusion is produced by at least one of several fabricating means including bending the extension, punching the extension and the build-up of electrically conductive material. In this embodiment, the sliding member is attached and its elevation relative to a mounting surface adjusted with fasteners (not shown) inserted into attachment surface 11. A ring 12 is illustrated in FIG. 9 where additional attachment surfaces 13 are provided by the ring 12. Preferably, the mounting surfaces 13 are part of a stamped die comprising the ring 12 with extended tabs 13 that are subsequently folded back and under the main portion of the ring 12 or stamped so as to protrude into the main aperture and so as to be aligned with the attachment surfaces 11 of the sliding member 10 (not shown).

Figure 10:
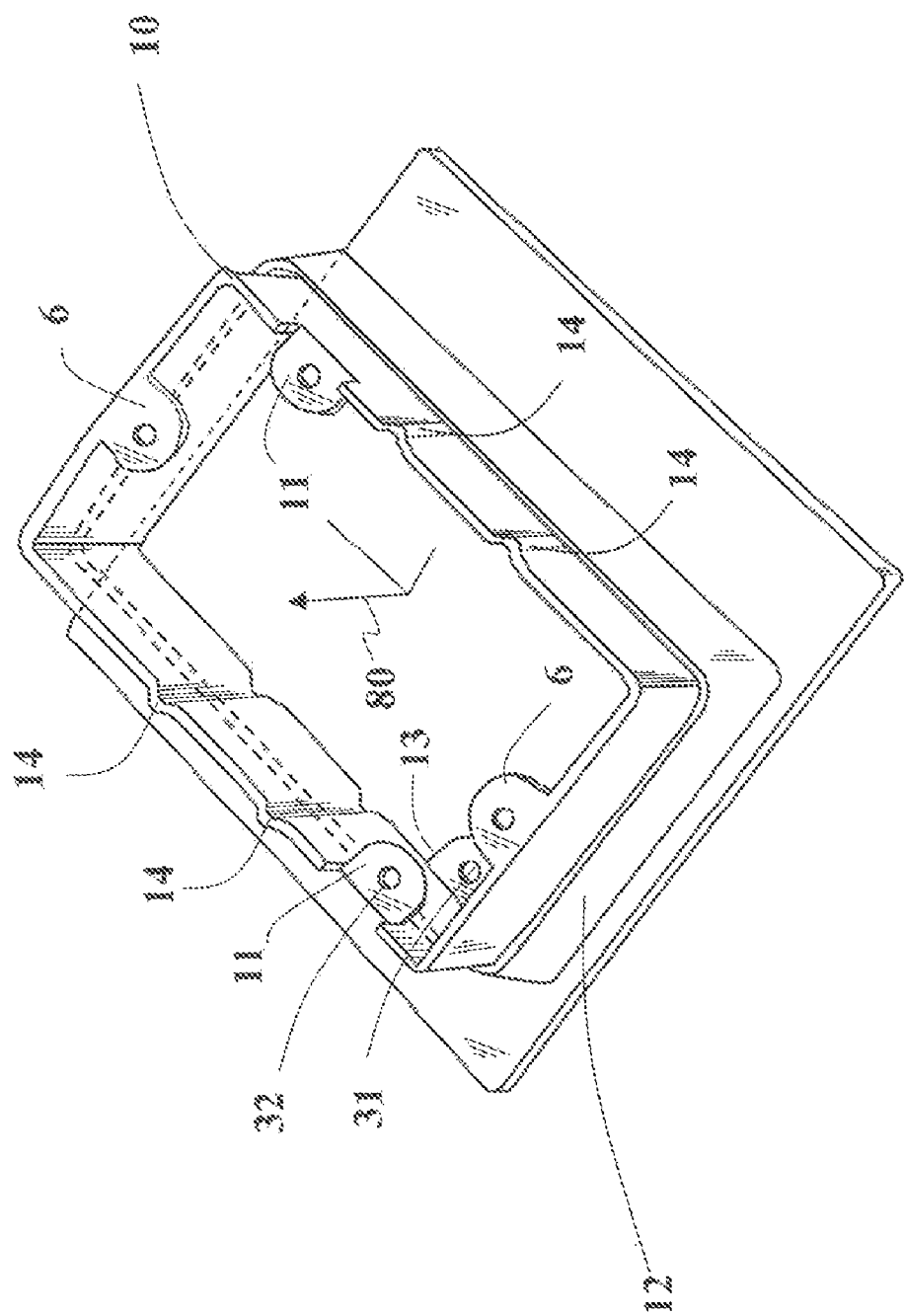
FIG. 10 is a perspective view of an extending member within a mud ring member of an alternative embodiment of the present invention.

FIG. 10 illustrates the sliding member 10 inserted into the main aperture of the ring 12. The protrusions of the sliding member 14 are in contact with the inner wall of the ring 12 and thereby provide electrical and mechanical contact between the ring 12 and the sliding member. The aperture 31 of the attachment surface 11 of the sliding member 10 and the aperture 32 of the attachment surface 13 of the ring 12 are aligned such that fasteners 15 (not shown) such as machine screws are able to connect the surfaces by insertion into the apertures 31, 32 of the surfaces 11, 13. While both the apertures of the attachment surfaces 11 of the sliding member 10 and the attachment surfaces 13 of the ring 12 may be tapped to engage a screw, a preferred embodiment has the attachment surfaces 11 of the sliding member 10 as a tapped aperture 32 and a smooth guiding aperture 31 for the attachment surfaces 13 of the ring 12. An alternative embodiment has the attachment surfaces 11 of the sliding member 10 as a smooth guiding aperture 32 and tapped aperture 31 for the attachment surfaces 13 of the ring 12.

FIG. 11A illustrates from a top view the interaction of the protrusions 14 of the sliding member 10 with the inner walls of the ring 12. In this example, the fasteners 15 are in place connecting surfaces of the ring 10 and sliding member 12. FIG. 11B illustrates a similar embodiment where the brackets 11 are along the same sides as those having the plug-mounting bracket 6.

Throughout FIGS. 12A-12D, horizontal, substantially continual, protrusions 14 are illustrated. Alternative embodiments have vertical, substantially continual protrusions, arrays of hemispherical protrusions, and other shapes protruding from at least one of the extending member 10 outer walls. FIG. 12A is a cross-sectional view of FIG. 11A illustrating the fastener 15 connecting with the bracket surface of the ring 12 and the bracket surface of the sliding member surface 11. A grommet 17 is illustrated as attached to the fastener 15 at a point below the sliding member bracket surface 11 as an example of a means of constraining the travel of the sliding member bracket surface 11 along the fastener 15. Put another way, the grommet 17 is used to force the extending member 10 to travel and secures the screw 15 to which it is attached. FIG. 12B illustrates an embodiment where a spring is placed about the fastener 15 in tension between the bracket surfaces 11, 12. FIG. 12C is a cross-sectional view of FIG. 11B illustrating the fastener 15 connecting with the bracket surface of the ring 12 and the bracket surface of the sliding member surface 11. The grommet 17 is shown applying force to the extending member 10. FIG. 12D is a cross-sectional view of FIG. 11B at 12C where the fastener is oriented in a direction opposite to that of the fastener described in FIG. 12C. The grommet 17 is shown securing the screw 15 from travel.

An alternative embodiment of the present invention illustrated in FIG. 13A has a sliding member 10 with a plurality of protrusions 18 fixedly attached to the surface of the sliding member 10 wall. For purposes of illustration, these plurality of protrusions 18 are shown running in, i.e., parallel with, the direction of travel 80 of the extending member 10, that is a principal axis of extension. In alternative embodiments as illustrated in FIG. 13B with a portion of the extending member at least one protrusion 18 on at least one outer side of the extending member runs horizontal, i.e., perpendicular, to the direction of travel 80 of the extending member 10. In these embodiments, the sliding member 10 is attached and its elevation relative to a mounting surface adjusted with fasteners (not shown) inserted into attachment surface 11. In the several alternative embodiments of the invention, the plurality of protrusions 18 are pimples, ridges, or segments of electrically conductive material fixedly attached to the surface of the sliding member 10 wall sufficiently raising the surface of the sliding member 10 wall to cause electrical and mechanical contact with the ring 12 when the sliding member 10 is inserted into the ring 12.

An alternative embodiment of the present invention, illustrated in FIG. 14 has an extending or sliding member 10 with a plurality of protrusions 18 fixedly attached to the outer wall surface of the sliding member 10 and sized in elevation from the surface of the extending member 10 wall to cause friction and tension mounting when inserted into the adapting member or ring 12 (not shown). In this example embodiment, rather than using fasteners 15, the tight fitment and resulting stiction, i.e., the sticking friction between the plurality of protrusions 18 and the inner wall of the adapting member 12 sustain the mechanical and electrical contact with the adapting member 12. Alternative protrusions for this embodiment include pimples, ridges, or segments of electrically conductive material fixedly attached to the outer wall surface of the extending member 10.

Figure 15:
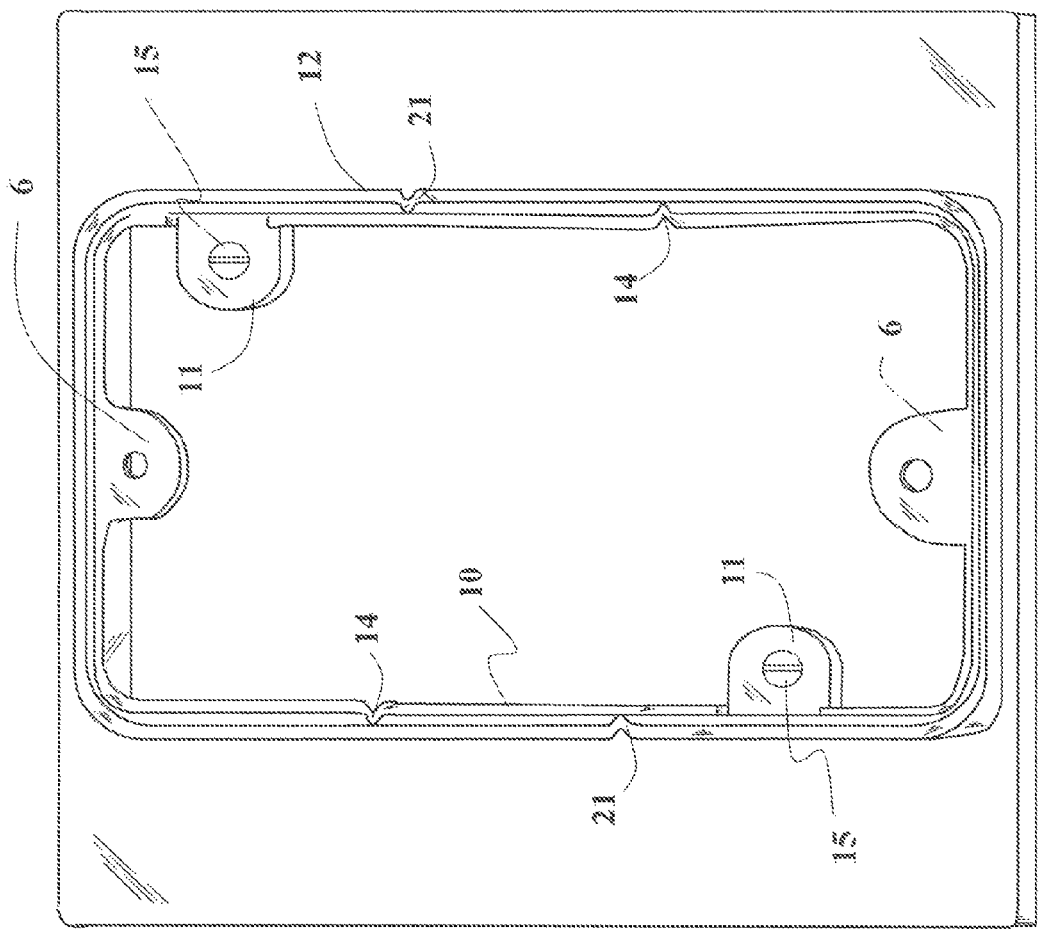
FIG. 15 is a top view of an assembly of an alternative embodiment of the present invention.

Alternative embodiments have the adapting ring 12 with protrusions, stamped or affixed, or otherwise, either separately or in combination with the sliding member 10. FIG. 15 illustrates stamped adapting member protrusions 21 of the adapting member 12 in combination with stamped extending member protrusions 14 of the sliding member 10. While some embodiments employ only the slider protrusions as shown in FIGS. 11 and 13 other embodiments employ only adapting member protrusions as shown in FIG. 15.

Figures 16, 17, 18:
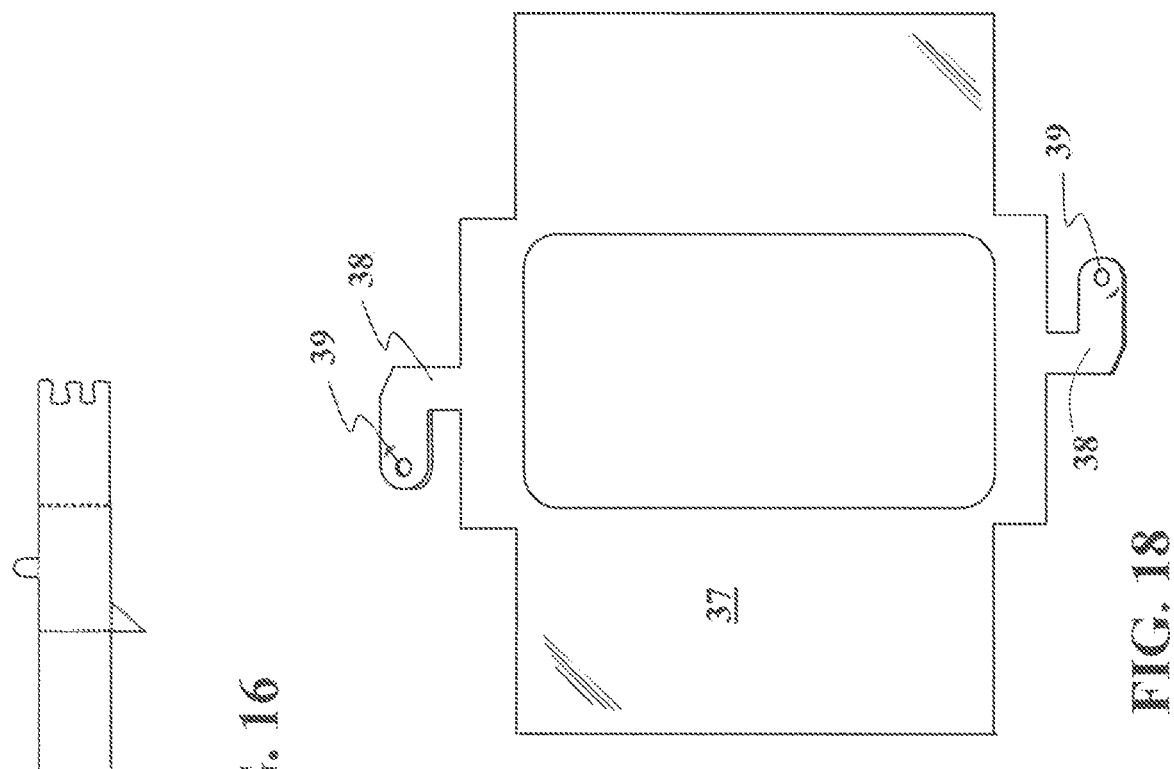
FIG. 16 is a planform view of an extending member of an alternative embodiment of the present invention.
FIG. 17 is an extending member of an alternative embodiment of the present invention.
FIG. 18 is a planform of a mud ring member of an alternative embodiment of the present invention.

FIG. 16 illustrates an example form of an alternative embodiment of the slider, or extending member, before protrusions are stamped and other shaping has taken place. FIG. 17 illustrates the alternative elevation member 35, where the elevation member 35 is shaped into a tubular member and connected 36, the slider bracket, or upper bracket is formed 22, from a bent tab for example. The upper bracket has an aperture 23 that preferably is adapted to receive a threaded fastener.

FIG. 18 illustrates a form of an alternative adapting member 37 with bracket portions 38 extended showing guiding apertures 39. Once stamped, the bracket portions are extended and shaped to provide a surface with a guiding aperture. A blank of an adapting member 37 such as the example of FIG. 18 may be stamped or otherwise drawn into the preferred shape, particularly with respect to the flange portion with the mounting bracket 38 preferably bent into shape. FIG. 19 illustrates a top view of an alternative adapting member 37 having the flange portion bent into shape with bracket portions 38 having guiding apertures 39.

Figure 20A:
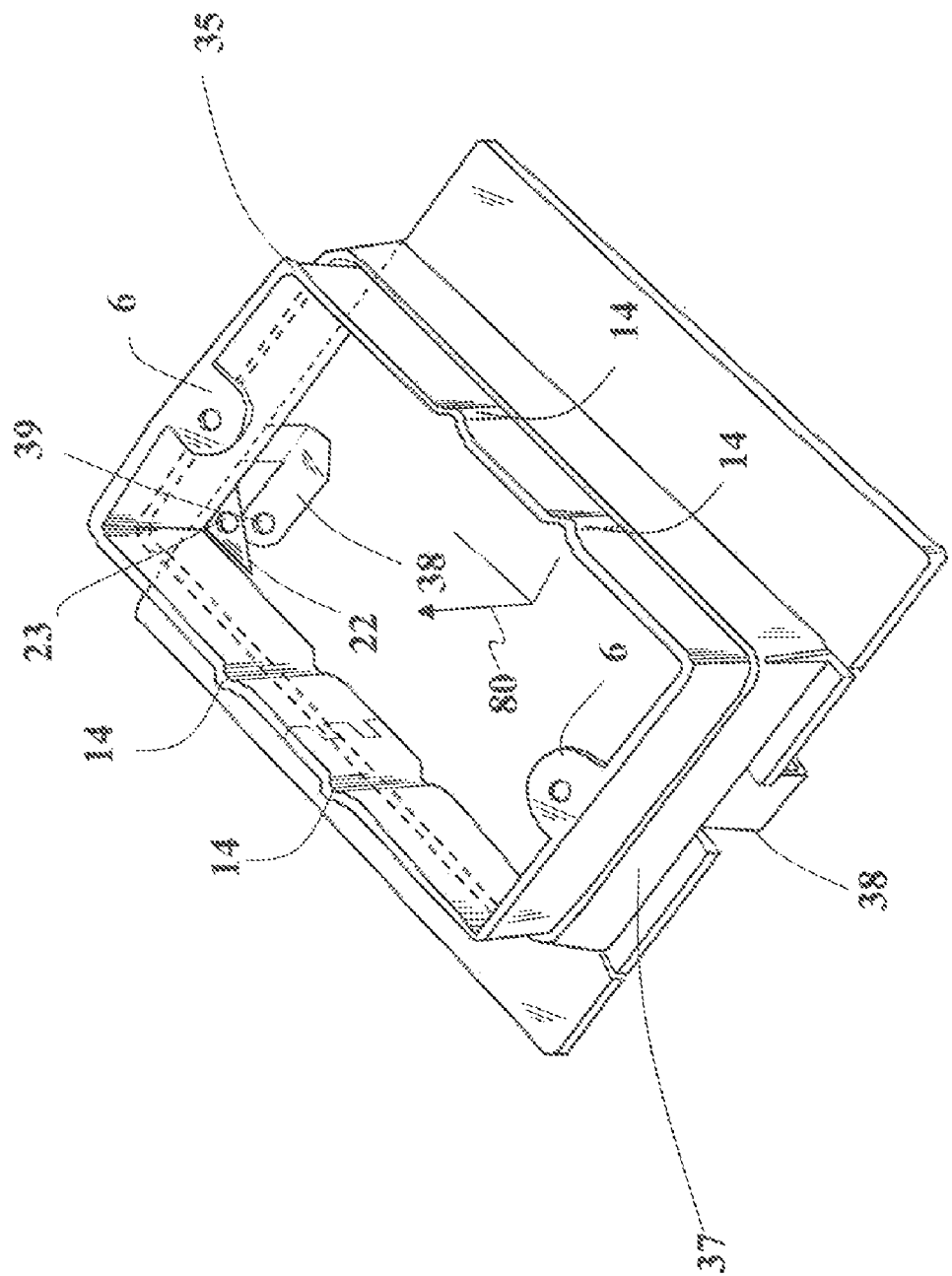
FIG. 20A is a perspective view of an extending member within an adapting member of an alternative embodiment of the present invention.

FIG. 20A illustrates in a perspective view the extending member 35 inserted into the ring member 37 so that the aperture 23 of the upper bracket 22 is aligned with the aperture 39 of the lower bracket 38. FIG. 20B illustrates in a perspective view the extending member 35 inserted into the adapting member 37 so that the aperture 23 of the upper bracket 22 is aligned with the aperture 39 of an alternative lower bracket 38'.

FIG. 21 illustrates in a top view the extending member 35 inserted into the adapting member 37 showing the tapped end of a screw 40 with the screw 40 engaging the upper bracket 22 and the lower bracket 38. Also shown is a lock washer 41 for each screw 40. A top view of an example lock washer 41 is shown in FIG. 22.

FIG. 23A is a cross-sectional view of FIG. 21 at 50 illustrating the engagement of the upper bracket 22 and the lower bracket 38 via the elevating fasteners 40. Where tapped screws are used 40, lock washers 41 are also preferably used and grommets are used in alternative embodiments. FIG. 23B illustrates in cross-sectional view an alternative embodiment having springs 34 inserted between the upper brackets 22 and the lower brackets 38. The springs 34 provide force to the extending member 35 and work to aid in the extension process.

Figure 25:
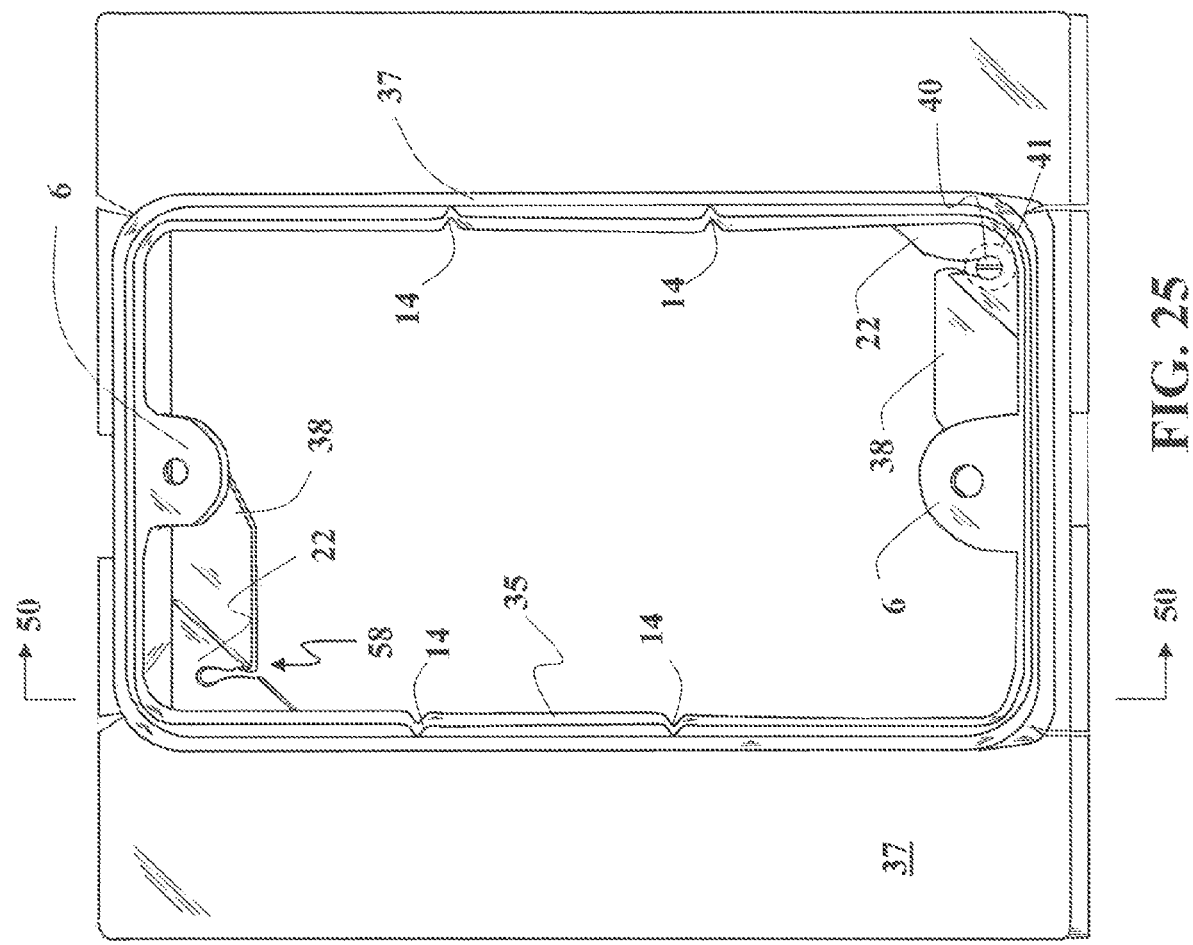
FIG. 25 is a top view of an assembly of an alternative embodiment of the present invention.

In several embodiments as illustrated in the example of FIG. 24, the adapting member is first installed with a bracket having an aperture 39 with lateral access 57. In this example, FIG. 25 illustrates the extending member that is inserted into the adapting member also has apertures adapted for lateral access 58. A fastener 40 having a washer 41 for example may be inserted into the aligned apertures laterally.

Figure 28:
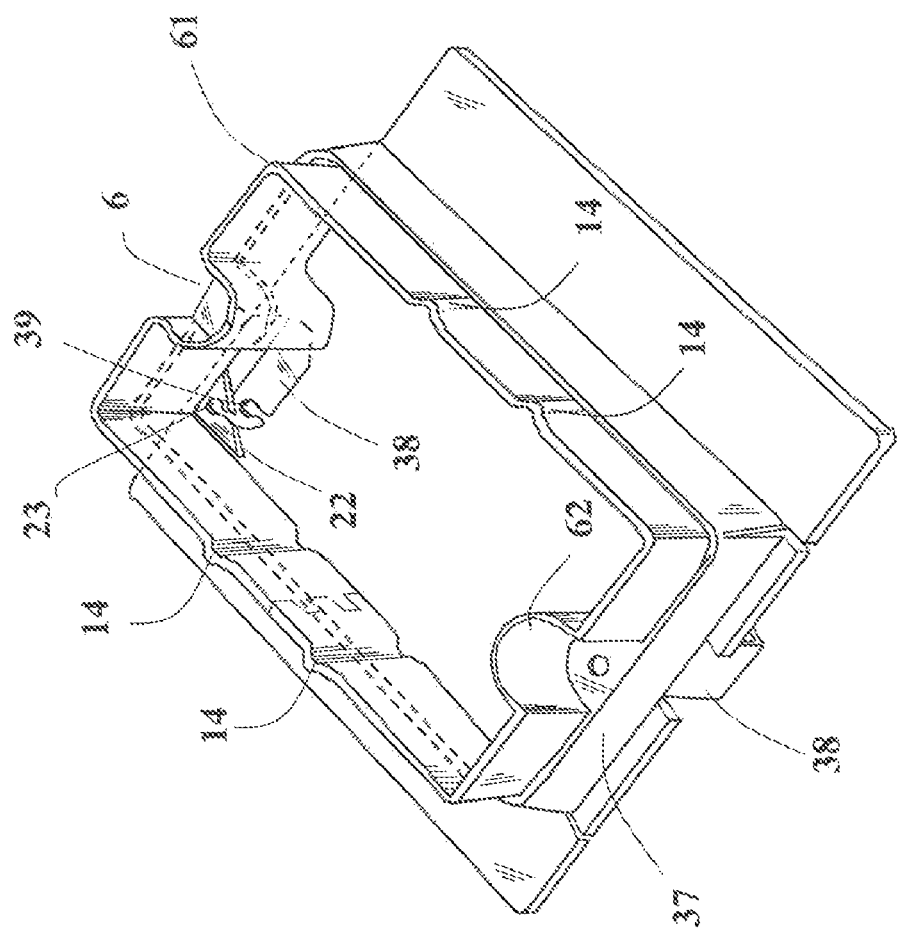
FIG. 28 is a perspective view of an assembly of an alternative embodiment of the present invention.
Figure 27:
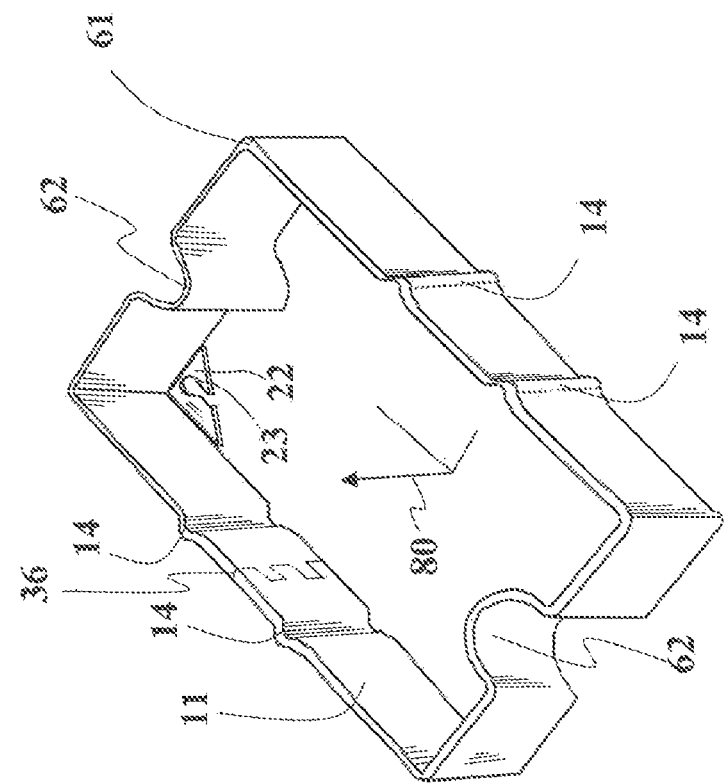
FIG. 27 is a perspective view of an extending member of an alternative embodiment of the present invention.
Figure 30:
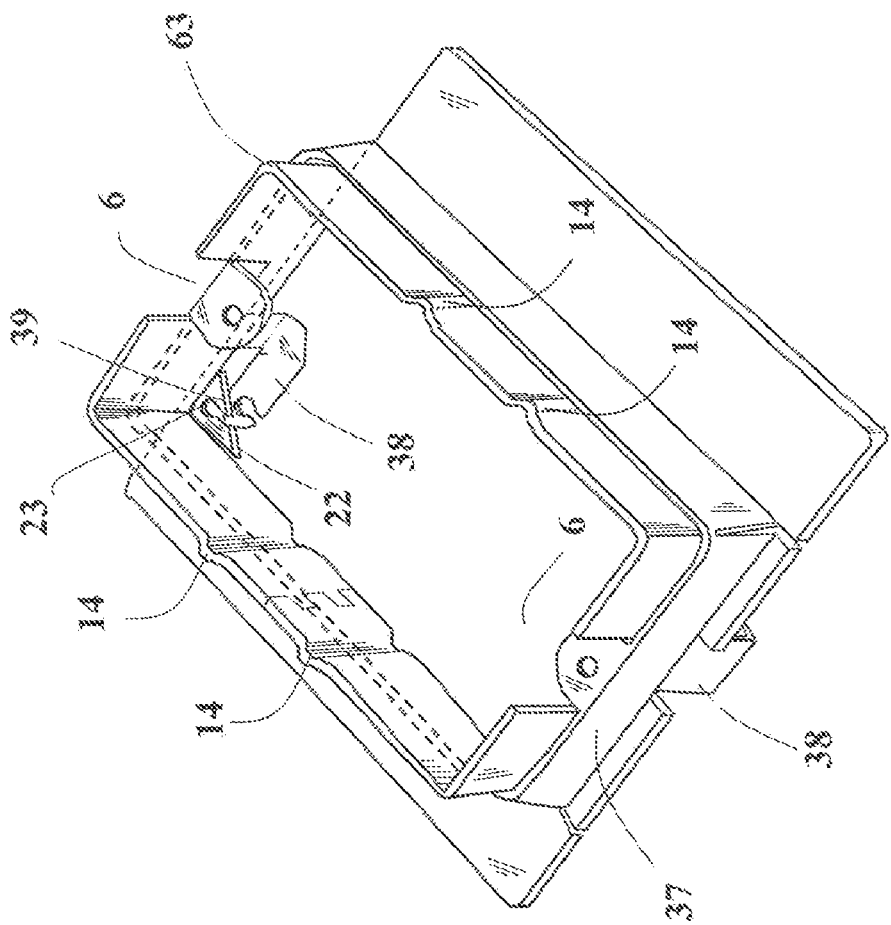
FIG. 30 is a perspective view of an assembly of an alternative embodiment of the present invention.
Figure 29:
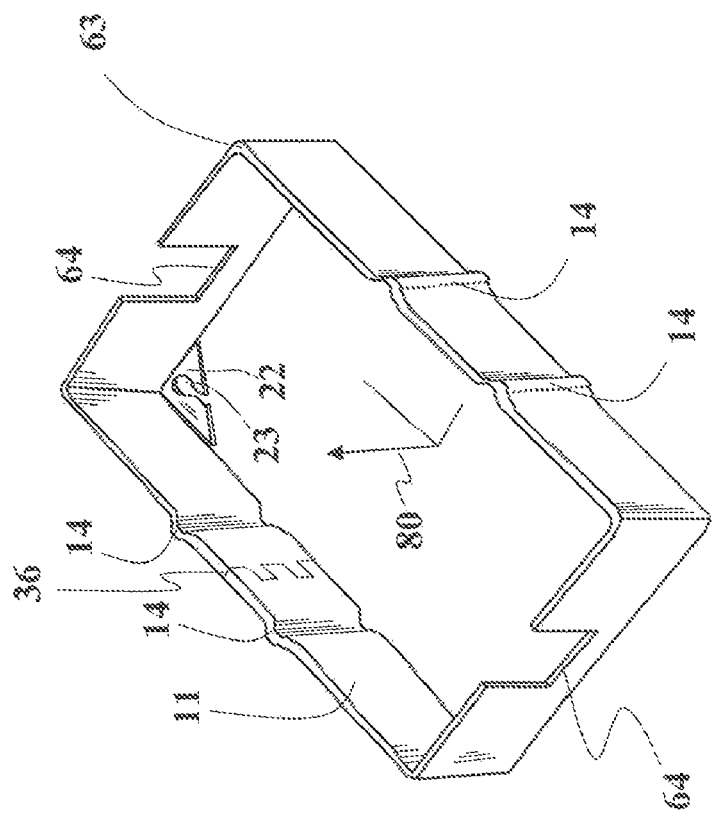
FIG. 29 is a perspective view of an extending member of an alternative embodiment of the present invention.

FIG. 26 illustrates an alternative embodiment of the adapting member 37 including at least one plug/switch mounting plate 59 and in this example, two plug/switch mounting plates. The example embodiment of FIG. 26 satisfies the typical functions of a mud ring but additionally supports a number of extending members including the following extending member examples that may be subsequently installed. FIG. 27 illustrates an extending member 61 where one or more walls of the extending member 61, and in this example two walls, are shaped so that the extending member passes around the plug/switch mounting plate by being substantially semi-circular in transverse cut 62 and accordingly the extending member shape supports full travel extending member 61. FIG. 28 illustrates the extending member 61 of FIG. 27 inserted within the flange portion of the adapting member 37. An alternative extending member 63 illustrated in FIG. 29 has a cut-out 64 along each of the one or more walls, and in this example two walls, of the extending member 63. FIG. 30 illustrates the extending member 63 of FIG. 29 inserted within the flange portion of the adapting member 37.

In several embodiments, one or more fasteners provide a mechanical means of extending and retracting the slider relative to the ring. While screws are preferred, other embodiments do not use fasteners and instead rely on the stiction provided by the ring and or slider protrusions acting against one another. An alternative to the screw faster is illustrated in FIGS. 31A-31F. In FIG. 31A, the front view of a comb pin 70 is illustrated. In the top view of the comb pin 70 (FIG. 31B), a groove 71 is provided for engagement with a flat screwdriver or equivalent tool. The side view (FIG. 31C) of the comb pin 70 shows the pin to be substantially flat. In FIG. 31D, the comb pin 70 is positioned to engage 76 representative upper 72 and lower brackets 74 having substantially slotted apertures 73, 75. The upper bracket 72 in this example is contiguous with an extending member (not shown) and the lower bracket 74 is contiguous with a ring member (not shown). FIG. 31E illustrates the insertion of the comb pin through the upper and lower brackets. With a ninety degree turn 78 of the comb pin 70, the spacing 79 between the upper 72 and lower brackets 74 is fixed by the comb pin as shown in a side view in FIG. 31F. The comb pin 70 thereby provides mechanical and electrical connectivity between the upper 72 and lower brackets 74. FIG. 31G illustrates an alternative embodiment wherein a spring 56 surrounds the portion of the comb pin 70 between the upper 72 and lower brackets 74 and is tension between these brackets 72, 74 providing additional mechanical support to the extending member and electrical connectivity between the extending member (not shown) and the adaptor or ring member (not shown).

Figure 32:
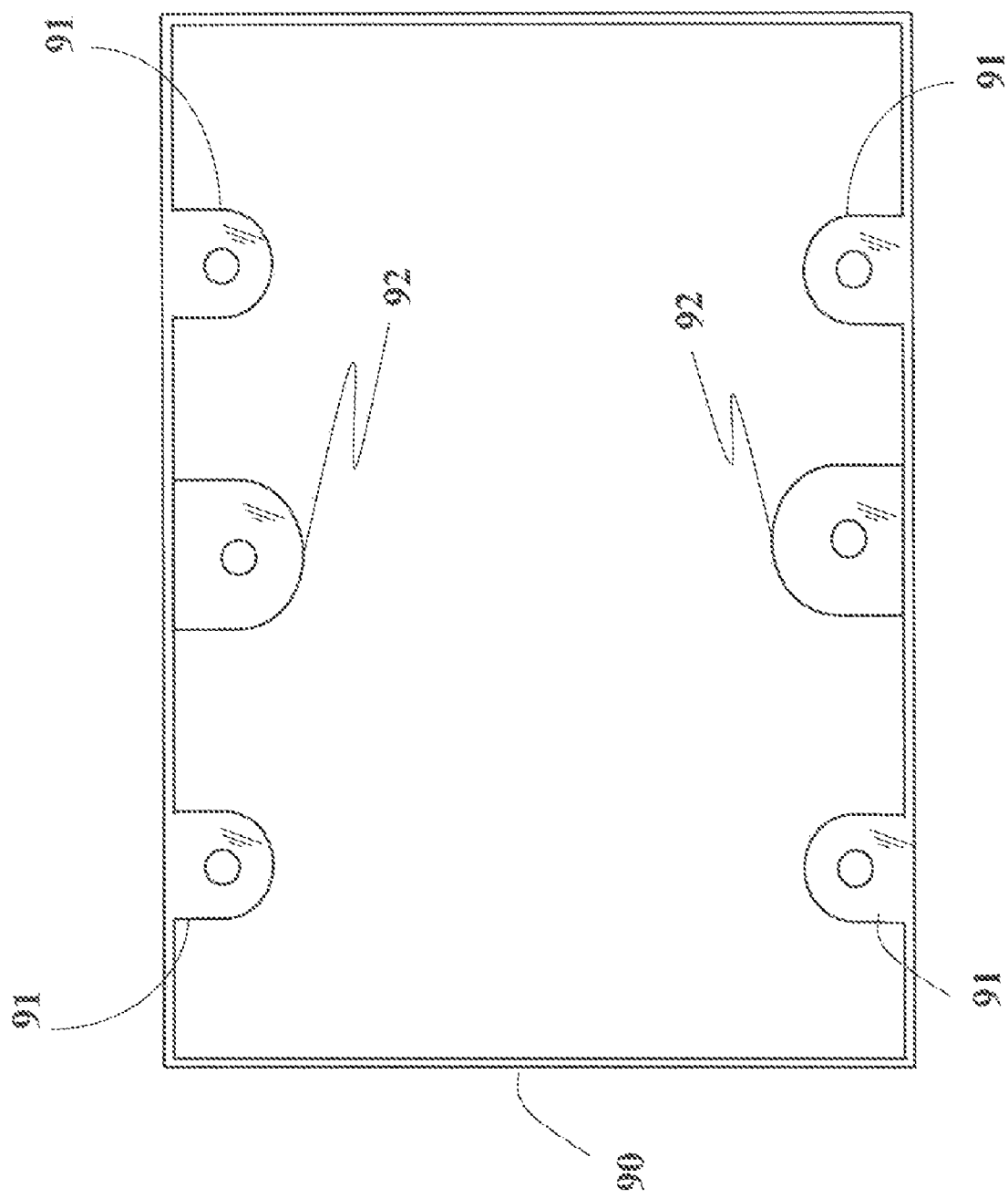
FIG. 32 is a top view of two-gang extending member embodiment of the present invention.
Figure 33:
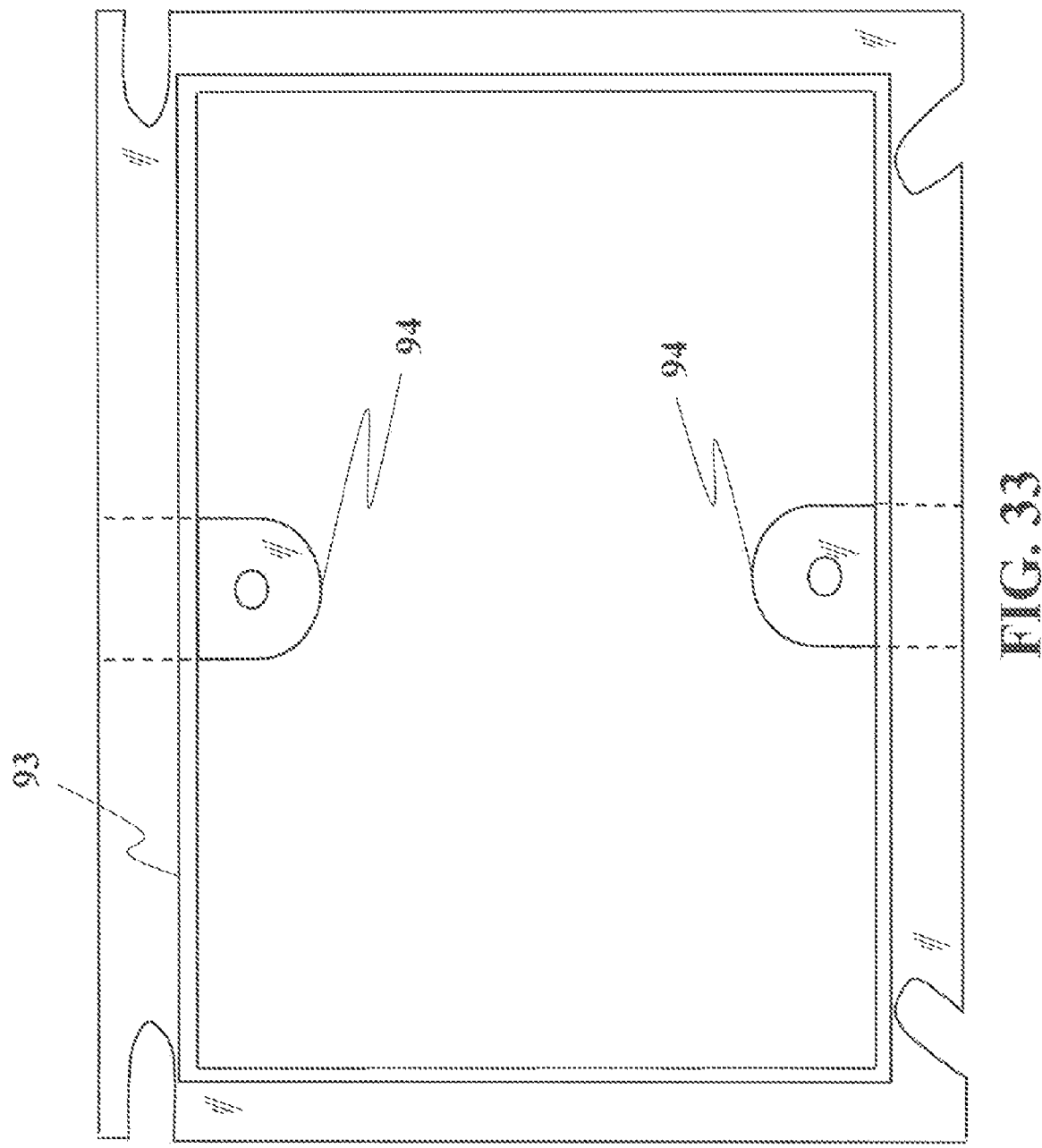
FIG. 33 is a top view of two-gang adapting member embodiment of the present invention.
Figure 34:
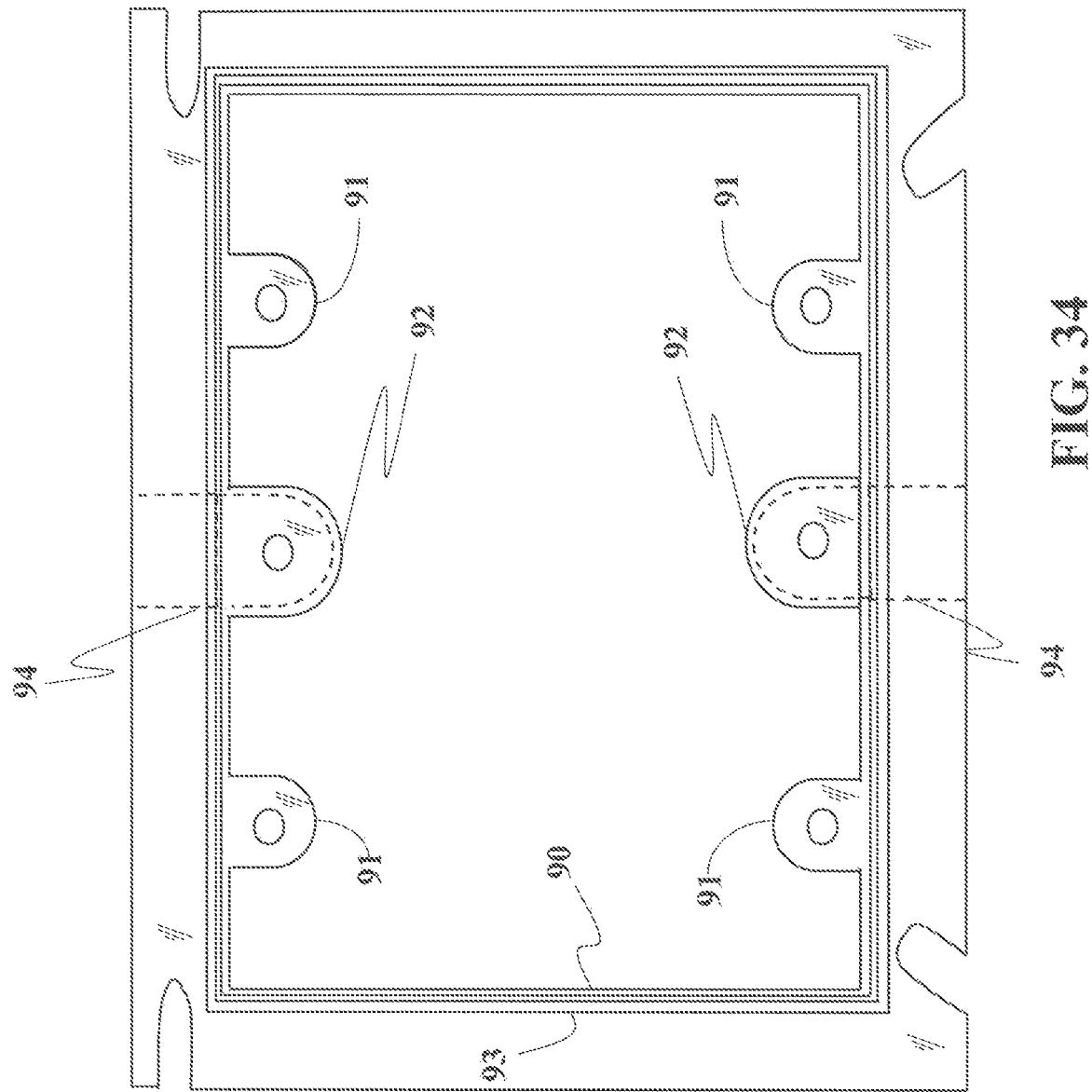
FIG. 34 is a top view of two-gang assembly embodiment of the present invention.

FIG. 32 illustrates an example two-gang extending member 90 embodiment of the present invention. The switch/plug mounting plates 91 are each positioned to receive a switch or a plug and together mount two such devices in tandem. The upper brackets 92 of the elevating member 90 are, in this example, substantially aligned along a line of symmetry that also bisects the mounted plugs and/or switches. FIG. 33 illustrates an example two-gang adapting member 93 embodiment of the present invention. The lower brackets 94 of the adapting member 93 are substantially along the same line of symmetry as the upper brackets 92 (FIG. 32) of the elevating member 90. FIG. 34 illustrates the two-gang extending member inserted into the two-gang adapting member. As with the several embodiments of the single switch/plug electrical box extenders described above, the two-gang embodiments include the various fastening and elevating means and bracket embodiments for laterally insertable fasteners as disclosed above.

Figure 35:
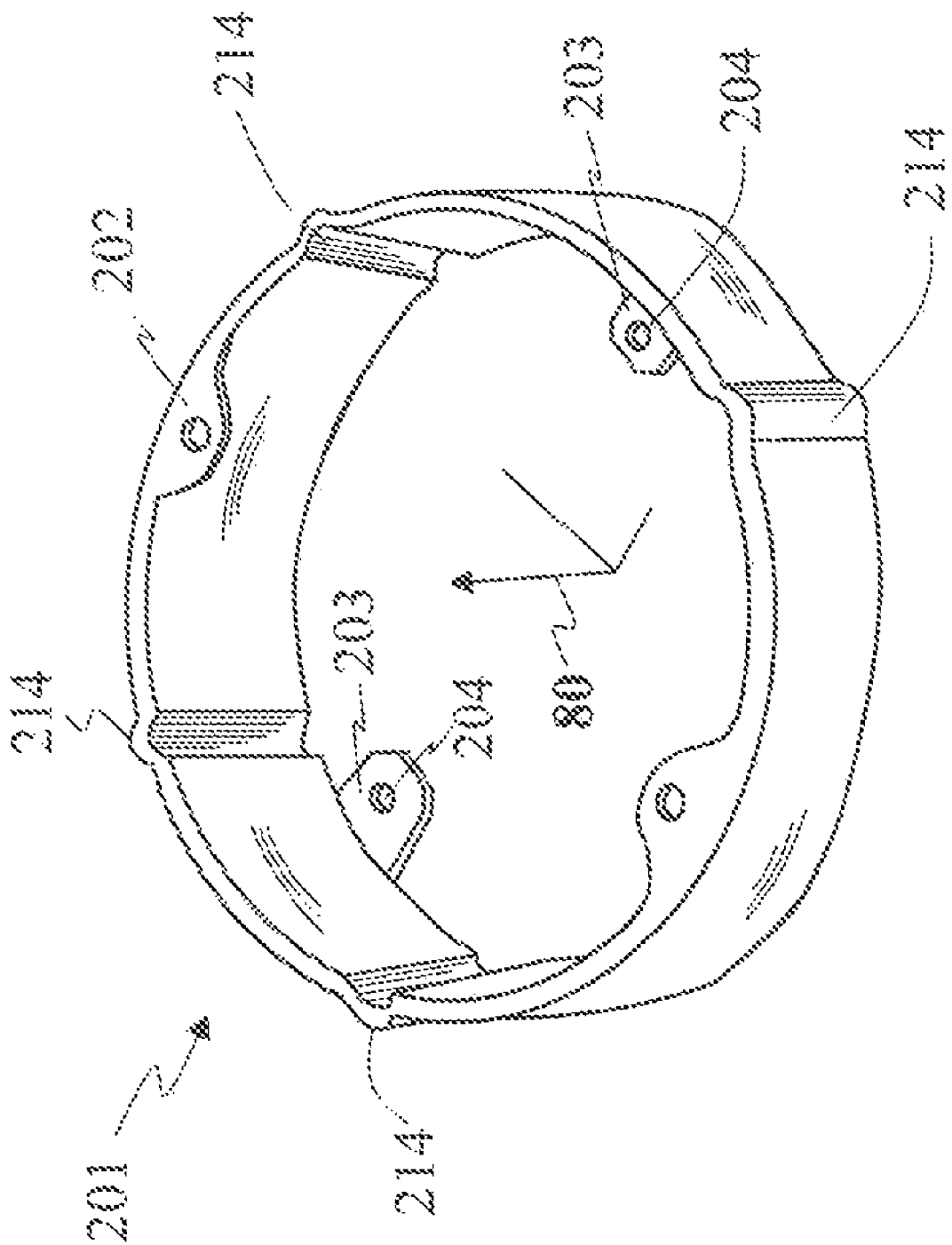
FIG. 35 is an isometric view of an example alternative extending member of the present invention.

An alternative embodiment of the present invention includes a circular sliding member and either rounded or square-shaped adapting plate portions adapted to detachably attach to an electrical box, for example. Oval sliding members are accommodated in a fashion substantially similar to the circular examples that follow. FIG. 35 illustrates the circular sliding member 201 with electrical device mounting plates 202 and a plurality of preferably linear protrusions 214 stamped into the sliding member wall preferably parallel with the axis of extension as shown in this example. The slider bracket, or upper bracket 203 connects the slider with the mud ring member by way of an elevating fastener. The upper bracket 203 has an aperture 204 which may be tapped to engage an elevating fastener such as a screw for example.

Figure 37:
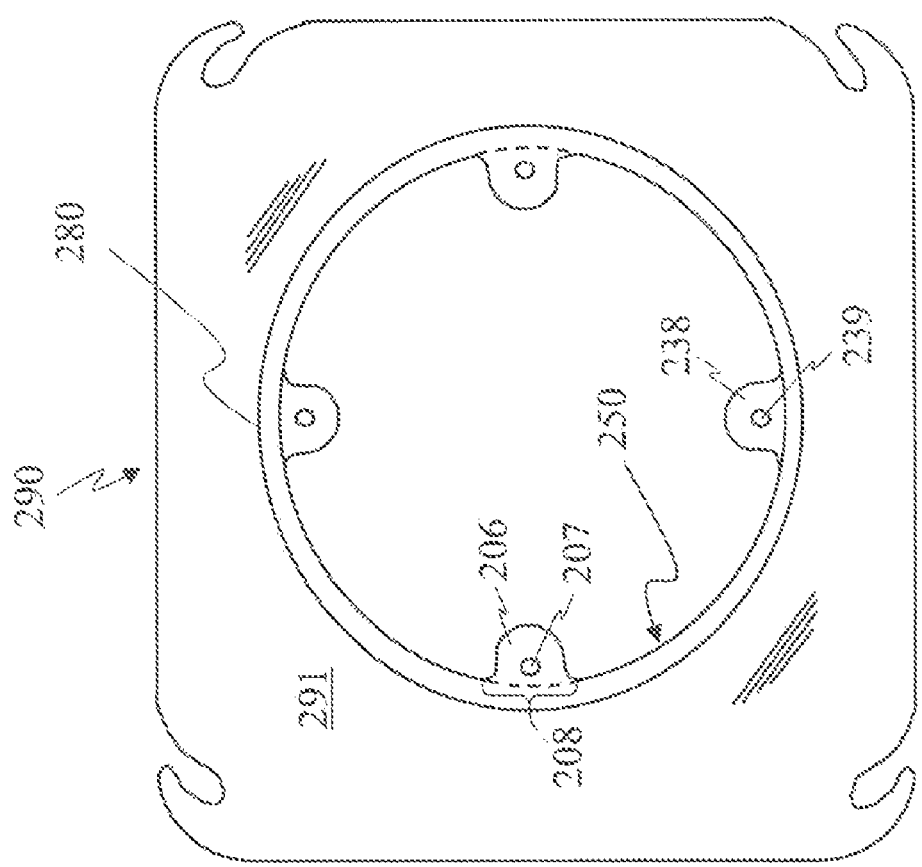
FIG. 37 is a top view of alternative example of a mud ring member or adapting member embodiment of the present invention.
Figure 36:
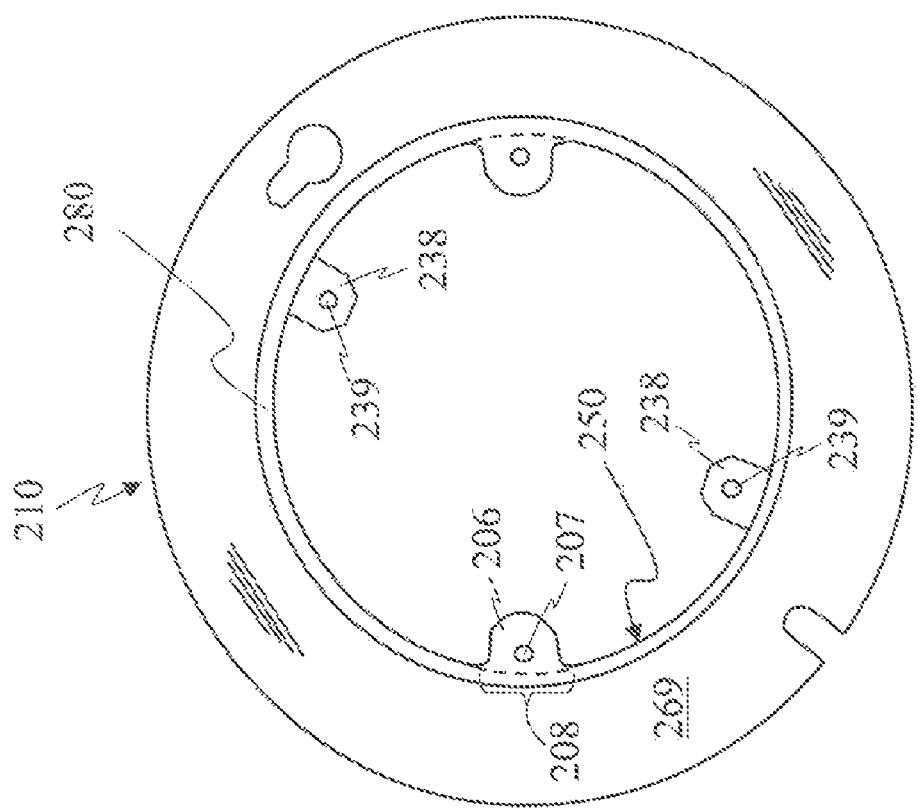
FIG. 36 is a top view of the example alternative extending member of the present invention.

FIG. 36 illustrates an adapting circular ring 210 with a circular base including at least one plug/switch mounting plate 206 and in this example, two plug/switch mounting plates 206 extending from the top portion of the flange 280 of the ring 210. As an example of the frangible device mounting plates, preferably perforations 208 or creases allow the mounting plate 206 to be snapped or worked off of the ring 210, or otherwise removed from the ring 210, enabling the sliding member 201 to be inserted into the adapting member 210 by way of the flange aperture formed or otherwise bordered by the flange inward side 250. The lower bracket 238 provides for the connecting of the sliding member 201 via the elevating fastener to the adapting ring. The lower bracket 238 has a ring aperture 239 which may be tapped to engage an elevating fastener such as a screw, where a preferred embodiment has a smooth rather than threaded guiding aperture 239. FIG. 37 illustrates an alternative mud ring 290 having a square base adapting plate 291.

FIG. 38 illustrates in a top view an extending member 201 inserted into a ring member 210 showing the tapped end of a screw 240 having a groove, where the screw 240 engages the upper bracket 203. The protrusions 214 of the sliding member 201 are in contact with the inner wall 250 of the flange of the ring 210 which form the boundary of the ring aperture and thereby provide electrical and mechanical contact between the ring 210 and the sliding member 201. Also shown is the remaining region of the ring 109 after snapping off or otherwise removing the frangible device mounting tabs 206 previously extending from the top edge of the flange 280 of the ring member 210 into the aperture formed by the flange 280 and substantially parallel to the adapting plate portion 269 of the mud ring or adapting member 210. An alternative embodiment of the ring member 210 is made without electrical device mounting tabs. FIG. 39 illustrates in a perspective view the extending member 201 inserted into the adapting member 210 so that the aperture 204, as illustrated in FIG. 35, of the upper bracket 203 is aligned with the aperture 239, as illustrated in FIG. 36, of the lower bracket 238. The lower bracket 238 is shown extending into the well of an example octagonal electrical box 270. Also shown is the screw 240 engaging the upper bracket 203 and the lower bracket 238.

Figure 41:
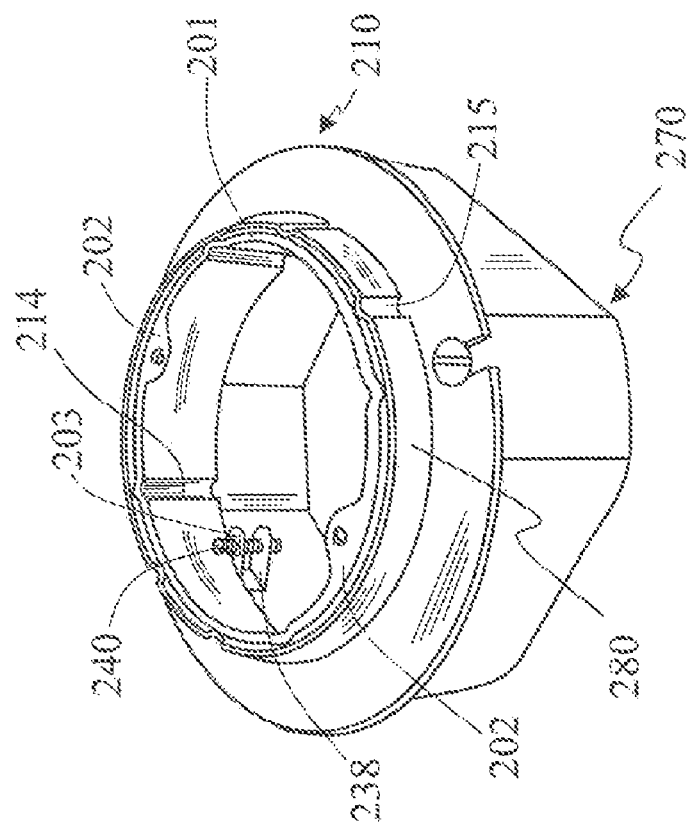
FIG. 41 is a perspective view of an extending member within an adapting member of an alternative embodiment of the present invention.
Figure 40:
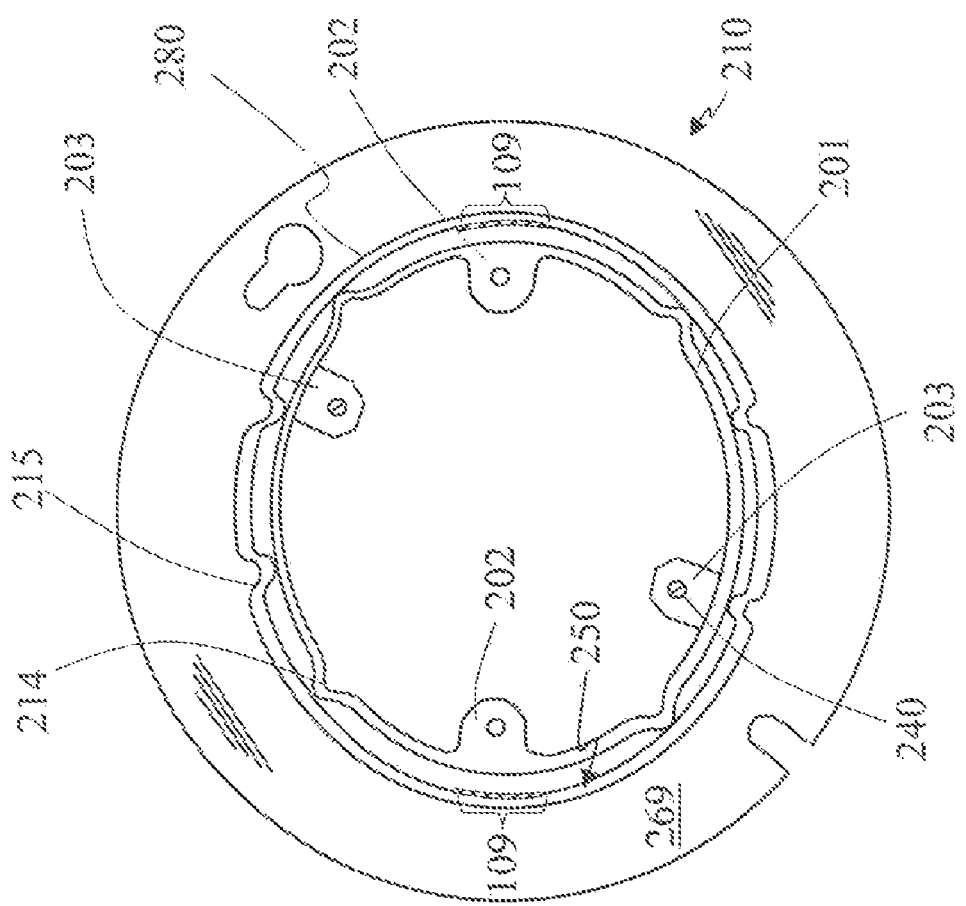
FIG. 40 is a top view of an assembly of an alternative embodiment of the present invention.
Figure 43:
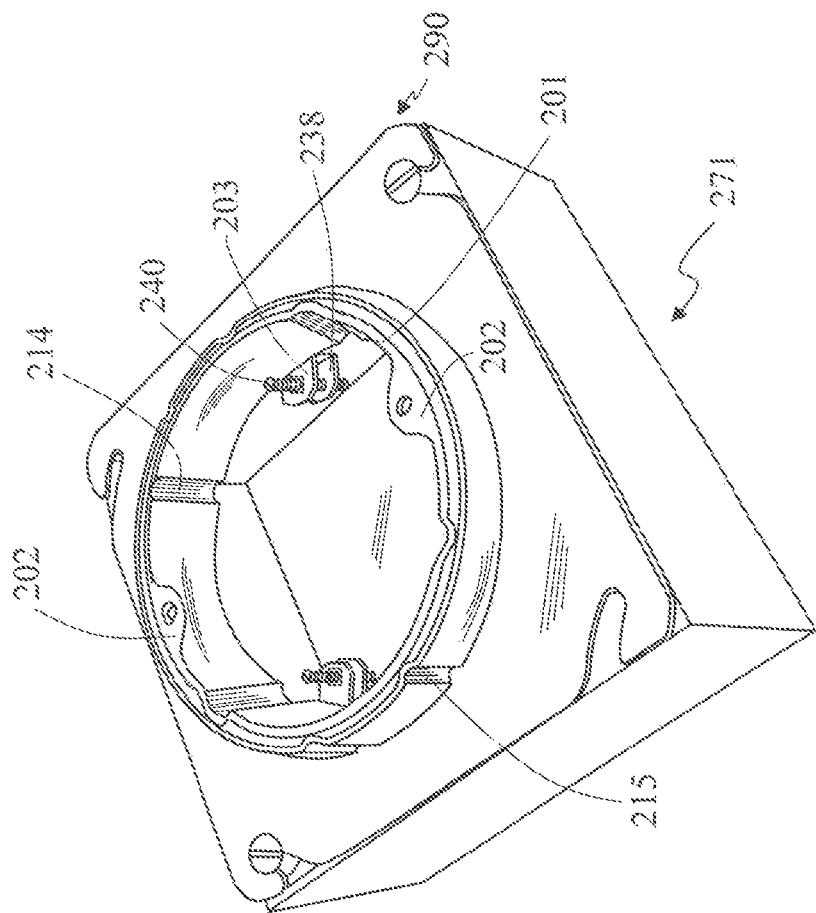
FIG. 43 is a perspective view of an extending member within an adapting member of an alternative embodiment of the present invention.
Figure 42:
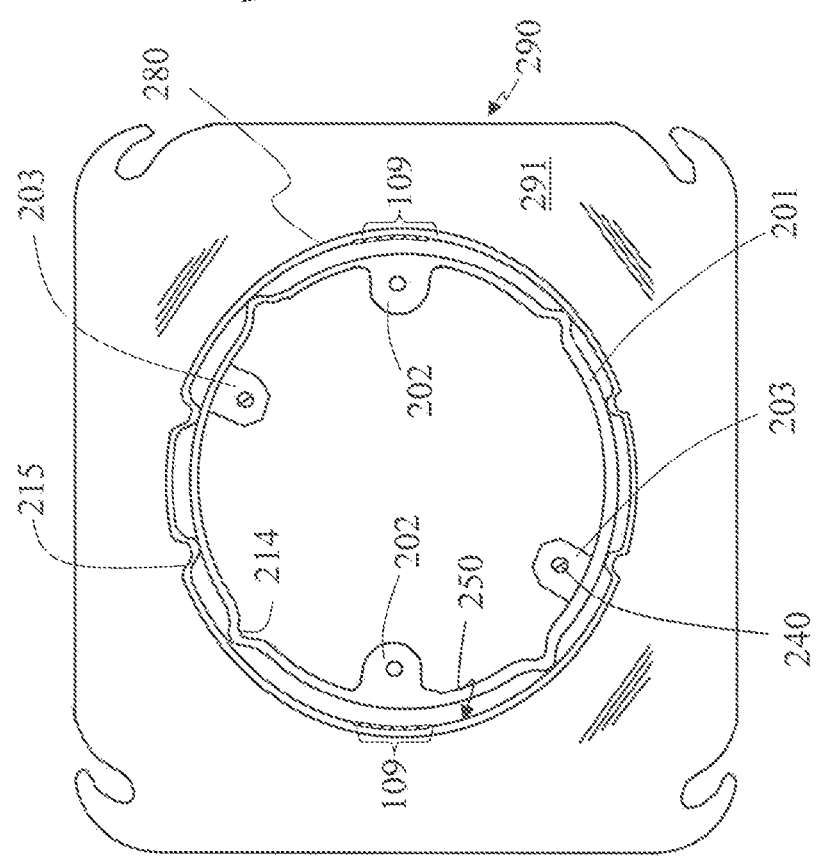
FIG. 42 is a top view of an assembly of an alternative embodiment of the present invention.

FIGS. 40-43 illustrate an alternative embodiment of an adapting ring 210 with a plurality of protrusions 215 preferably stamped into the ring wall. The protrusions of the adapting ring 215 are in contact with the outer wall of the sliding member 201 and thereby provide electrical and mechanical contact between the ring 210 and the sliding member 201. FIG. 40 illustrates, in a top view, the alternative embodiment where the ring protrusions 215 contact the outer wall of the slider 201 and the slider protrusions 214 contact the inner wall of the flange 280 of the mud ring 210. In an alternative embodiment, the slider 201 does not have protrusions, so that the assembly preferably relies upon the adapting ring protrusions 215 from the flange inner wall 250 for electrical connectivity. FIG. 41 illustrates, in an isometric view, the alternative embodiment where the ring protrusions 215 contact the outer wall of the slider and the slider protrusions 214 contact the inner wall of the flange 280 of the mud ring 210. FIG. 42 illustrates, in a top view, the alternative embodiment where the ring protrusions 215 contact the outer wall of the slider 201 and the slider protrusions 214 contact the inner wall 250 of the flange 280 of the mud ring 290 having a rectangular adapting plate 291 for detachably attaching to a rectangular electrical box. Also illustrated is the region of the flange remaining 109 after the removal of the mounting plates 206, shown in FIGS. 36 and 37. FIG. 43 illustrates, in an isometric view, an alternative embodiment of the mud ring 290 adapted to detachably attach to a rectangular electrical box 271 where the ring protrusions 215 contact the outer wall of the slider 201 and the slider protrusions 214 contact the inner wall of the flange 280 of the mud ring 290.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. While illustrated as a single assembly, the adapting member and, as an assembly, the extending member, are applicable to an array of attachable electrical devices and the adapting member and the assembly are applicable to an array of assemblies mounted to electrical boxes of extended size (e.g., elongated rectangles receiving several assemblies).

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. While the drawings reflect an electrical box, ring, or adapting member, and the sleeve, or extending member, all made of galvanized steel, the invention may be embodied with members each made of plastic, preferably fire resistant plastic, metal, preferably galvanized steel, ceramic or combinations thereof. In those embodiments having the electrical box, adapting member and extending member each made of plastics and ceramics or combinations thereof, it is preferred that electrical conductivity be maintained by reverse thread screws as extending fasteners. In addition, the term electrical box is used generically to refer to grounded electrical housing of three-dimensional shapes including boxes of rectangular sides, boxes of square sides, and boxes of cylindrical shapes with circular or oval tops and bottoms or other shapes acceptable in the electrical applications and the grounded electrical housing that may accommodate one or more plugs and or switches.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An adapting member adapted to slidably attach to an extending member via one or more fasteners, the adapting member comprising:
one or more mounting brackets, each mounting bracket comprising a first portion and a tab; each tab comprising one or more guiding apertures; and
a mudring integrally connected to the one or more mounting brackets, the mudring comprising:
a base; and
a flange integrally attached to a first side of the base; wherein the flange forms an opening adapted to receive the extending member therein when retracted;
wherein each first portion projects opposite the first side and in a direction substantially perpendicular from the base, and wherein each tab projects from a respective each first portion in a direction substantially parallel with the base to a position opposite the first side of the base coinciding with the opening, wherein the one or more guiding apertures are adapted to engage at least one of the one or more fasteners disposed within the opening; and wherein rotation of one or more fasteners displaces the extending member relative to the flange in a direction substantially perpendicular to the base.

2. The adapting member of claim 1 wherein each of the one or more fasteners comprises a grommet fixedly attached to a portion of the fastener wherein at least one tab is disposed between a fastener head and a fixedly attached grommet.

3. An adapting member configured to slidably attach to an extending member via one or more fasteners, the adapting member comprising:
one or more mounting brackets, each mounting bracket comprising a first portion and a tab; each tab comprising one or more guiding apertures; and
a mudring connected to the one or more mounting brackets, the mudring comprising:
a base having an aperture; and
a ring portion projecting from a first side of the base and disposed proximate to the aperture; wherein ring portion and aperture form an opening adapted to receive the extending member therein when retracted;
wherein each first portion projects opposite the first side of the base and in a direction substantially perpendicular from the base, and wherein each tab projects from a respective each first portion in a direction substantially parallel with the base to a position behind the first side of the base and coinciding with the opening, wherein the one or more guiding apertures are adapted to engage at least one of the one or more fasteners disposed within the opening; and wherein rotation of one or more fasteners displaces the extending member relative to the ring portion in a direction substantially perpendicular to the base.

* * * * *